(12) United States Patent
Congdon et al.

(10) Patent No.: US 12,202,764 B2
(45) Date of Patent: Jan. 21, 2025

(54) COATING OF GLASS-BASED ASSEMBLY

(71) Applicant: CORNING INCORPORATED, Corning, NY (US)

(72) Inventors: Erin Katherine Congdon, Canisteo, NY (US); Ronald William Davis, Jr., Horseheads, NY (US); Jason Thomas Harris, Horseheads, NY (US); Shandon Dee Hart, Elmira, NY (US); John Tyler Keech, Santa Barbara, CA (US); Naveen Prakash, Painted Post, NY (US); James Joseph Price, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 18/238,179

(22) Filed: Aug. 25, 2023

(65) Prior Publication Data
US 2024/0400440 A1  Dec. 5, 2024

Related U.S. Application Data

(60) Provisional application No. 63/526,550, filed on Jul. 13, 2023, provisional application No. 63/470,498, filed on Jun. 2, 2023.

(51) Int. Cl.
| C03C 17/34 | (2006.01) |
| C03C 17/00 | (2006.01) |
| C03C 17/23 | (2006.01) |

(52) U.S. Cl.
CPC ........ *C03C 17/3417* (2013.01); *C03C 17/002* (2013.01); *C03C 17/23* (2013.01);
(Continued)

(58) Field of Classification Search
CPC .............. C03C 17/22–27; C03C 17/34; C03C 17/3411–3494; C03C 2217/77;
(Continued)

(56) References Cited

U.S. PATENT DOCUMENTS 3,411,934 A   11/1968  Englehart et al.
5,162,136 A * 11/1992  Blum .................... C03C 17/225
                                                  427/126.3

(Continued)

FOREIGN PATENT DOCUMENTS

CN    207345192 U    5/2018
CN    103328398 B    9/2018
(Continued)

OTHER PUBLICATIONS

International Search Report and Written Opinion of the International Searching Authority; PCT/US2024/031357; dated Sep. 24, 2024; 9 pages; European Patent Office.
(Continued)

*Primary Examiner* — Z. Jim Yang
(74) *Attorney, Agent, or Firm* — Russell S. Magaziner

(57) ABSTRACT

A glass-based assembly includes a glass substrate and a coating layer coupled to the glass substrate. Ultimate strength of the glass substrate with the coating layer overlaying and coupled thereto is greater than that of the glass substrate alone, without the coating layer.

17 Claims, 14 Drawing Sheets

(52) U.S. Cl.
CPC .......... *C03C 17/34* (2013.01); *C03C 17/3411* (2013.01); *C03C 2217/213* (2013.01); *C03C 2217/218* (2013.01); *C03C 2217/77* (2013.01); *C03C 2217/78* (2013.01)

(58) Field of Classification Search
CPC .... C03C 2217/78; C03C 2217/21–244; C03C 2217/28–289; G02B 1/115; G02B 1/14; B32B 17/06; B32B 17/10–1099
See application file for complete search history.

(56) References Cited

U.S. PATENT DOCUMENTS

| | | | |
|---|---|---|---|
| 5,476,692 | A | 12/1995 | Ellis et al. |
| 6,013,333 | A | 1/2000 | Carson et al. |
| 6,120,908 | A | 9/2000 | Papanu et al. |
| 6,696,157 | B1* | 2/2004 | David .................. C23C 16/509 428/408 |
| 7,317,053 | B1 | 1/2008 | Gelman et al. |
| 8,778,496 | B2 | 7/2014 | Hart |
| 8,814,691 | B2 | 8/2014 | Haddick et al. |
| 9,435,915 | B1 | 9/2016 | Lower et al. |
| 10,436,945 | B2 | 10/2019 | Hart et al. |
| 11,072,558 | B2 | 7/2021 | Baloukas et al. |
| 11,242,280 | B2 | 2/2022 | Hart et al. |
| 11,407,681 | B2 | 8/2022 | Bellman et al. |
| 11,461,936 | B2 | 10/2022 | Freeman et al. |
| 2003/0077453 | A1* | 4/2003 | Oaku ................ B32B 17/10211 428/415 |
| 2004/0071960 | A1* | 4/2004 | Weber .................... B32B 17/10 428/428 |
| 2010/0255225 | A1 | 10/2010 | Cording et al. |
| 2012/0134025 | A1 | 5/2012 | Hart |
| 2014/0001181 | A1 | 1/2014 | Sharma et al. |
| 2014/0078589 | A1 | 3/2014 | Fujii et al. |
| 2014/0090864 | A1* | 4/2014 | Paulson ................ C03C 21/002 428/428 |
| 2014/0146394 | A1 | 5/2014 | Tout et al. |
| 2014/0151370 | A1* | 6/2014 | Chang .................. B65D 1/0215 220/62.15 |
| 2015/0037554 | A1* | 2/2015 | Gao ........................ C03C 17/23 428/217 |
| 2015/0376443 | A1 | 12/2015 | Chou et al. |
| 2016/0060161 | A1 | 3/2016 | Ellison et al. |
| 2016/0207825 | A1* | 7/2016 | Black .................... C03C 17/009 |
| 2016/0324016 | A1* | 11/2016 | Bellman ................ C03C 17/42 |
| 2017/0183255 | A1* | 6/2017 | Walther .................. C03C 3/083 |
| 2018/0315953 | A1* | 11/2018 | Hu .......................... B32B 27/34 |
| 2018/0339938 | A1 | 11/2018 | Bellman et al. |
| 2018/0354846 | A1* | 12/2018 | Koep .................... C03C 17/005 |
| 2019/0377386 | A1* | 12/2019 | Heo ...................... G06F 1/1637 |
| 2020/0044170 | A1* | 2/2020 | Seki ....................... B32B 15/08 |
| 2020/0097044 | A1* | 3/2020 | Kim ..................... B32B 17/067 |
| 2020/0103559 | A1 | 4/2020 | Fujii et al. |
| 2020/0156992 | A1* | 5/2020 | Baloukas ............... C03C 17/245 |
| 2020/0165162 | A1* | 5/2020 | Bellman ................ H05K 5/03 |
| 2020/0247715 | A1* | 8/2020 | Adib ..................... C03C 17/23 |
| 2020/0262746 | A1* | 8/2020 | He ............................ B32B 3/30 |
| 2020/0346973 | A1 | 11/2020 | Akao et al. |
| 2020/0410208 | A1* | 12/2020 | Thothadri ......... G02F 1/133305 |
| 2021/0087105 | A1* | 3/2021 | Bellman ................ C03C 17/009 |
| 2021/0149090 | A1 | 5/2021 | Nattermann et al. |
| 2021/0179479 | A1 | 6/2021 | Amma et al. |
| 2021/0300625 | A1 | 9/2021 | Henry et al. |
| 2021/0333437 | A1 | 10/2021 | Cangemi et al. |
| 2022/0251396 | A1 | 8/2022 | Amin et al. |
| 2022/0268967 | A1* | 8/2022 | Melcher ................ C03C 17/225 |
| 2023/0043558 | A1 | 2/2023 | Fadeev et al. |
| 2023/0166481 | A1* | 6/2023 | Boromand ......... G02B 27/0101 428/220 |

FOREIGN PATENT DOCUMENTS

| | | |
|---|---|---|
| CN | 208454827 U | 2/2019 |
| CN | 113500838 B | 11/2022 |
| EP | 3161081 B1 | 1/2019 |
| EP | 4008695 A1 | 6/2022 |
| GB | 1088557 A | 10/1967 |
| JP | 3019172 B2 | 3/2000 |
| JP | 5740388 B2 | 6/2015 |
| KR | 10-1654808 B1 | 9/2016 |
| WO | 89/10903 A1 | 11/1989 |
| WO | 2002/004133 A3 | 5/2002 |
| WO | 2013/078039 A1 | 5/2013 |
| WO | 2014/035942 A1 | 3/2014 |
| WO | 2016/033138 A1 | 3/2016 |
| WO | 2018/227192 A1 | 12/2018 |
| WO | WO-2021030098 A1 * | 2/2021 ............ C03C 17/32 |
| WO | 2022/126076 A1 | 6/2022 |

OTHER PUBLICATIONS

Disclosure by Applicant re: sale of coated glass submitted to USPTO Aug. 15, 2024, 1 page.

* cited by examiner

COATING OF GLASS-BASED ASSEMBLY

PRIORITY

This Application claims the priority benefit of U.S. App. Nos. 63/526,550 filed Jul. 13, 2023 and 63/470,498 filed Jun. 2, 2023, each of which is hereby incorporated by reference herein in its entirety.

BACKGROUND

Aspects of the present disclosure relate to coatings and glass-based assemblies.

Some glasses may be wire-saw cut from boules into wafers or otherwise formed in ways that leave the glasses with rough surfaces, which may then be lapped and polished to remove stress concentrations or crack nucleation sites. Then, finely polishing such glasses may provide a high quality surface, which may be important, especially for glasses with a high propensity to crack, where cracks may propagate from small surface flaws. However, fine polishing can be an expensive and slow process, and may also rely on use of acid-based etchants. Furthermore this process may not improve strength of fragile glasses enough for subsequent handling or processing.

A need exists for sufficiently or alternatively strengthening glasses.

SUMMARY

While experimenting with different anti-reflective coatings for brittle high-index glass, Applicants discovered as surprising synergy. Applicants' particular use of very thin coatings, not even intended to influence strength of the underlying glass substrate, unexpectedly increased the strength of that substrate substantially. Furthermore, the strengthening result Applicants discovered did not just strengthen the glass proportional to a super-position strength contribution of the small amount of coating on the brittle high-index glass. Instead, the anti-reflective coating strengthened the high-index glass significantly, such as by 10s of megapascals in ultimate strength (e.g., ultimate tensile strength), as discussed below and shown in FIG. 2 for example.

This strengthening result for the coated glass was surprising because hard, scratch-resistant coatings on glasses may do the opposite—while preventing scratching, such hard coatings may actually weaken the combined assembly of a glass substrate with a coating layer. Since making the above discovery, Applicants have worked to better understand and utilize the glass strengthening technology. Applicants believe the unexpected, synergistic strengthening effect may result from a combination of phenomena beneficial to strength of the corresponding glass-based assembly. Further the strengthening may result from mechanical behavior of the glass and coating together, largely independent of specific glass or coating compositions.

First, Applicants theorize the coating layer, with mechanical attributes disclosed herein (e.g., elasticity, ultimate strength, bonding, geometry, consistency of the coating), constrains open ends of very small crack nucleated at a surface of the underlying glass substrate. Such cracks may otherwise more freely propagate inward from the surface, as the glass substrate is stressed.

Second, the coating, if arranged to seal the surface of the glass substrate underlying the coating, may block water vapor or other elements carried by air from reaching crack tips, and thereby locally changing chemistry of the glass. Applicants believe that oxidation of the crack tips in some glasses for example may otherwise hasten crack growth.

Third, by selecting a coating with the mechanical attributes disclosed herein, the coating of the coating layer does not fail in cracking before the glass of the underlying glass substrate. Were the opposite the case, Applicants theorize cracks in the coating may otherwise focus stresses at contact points corresponding to the crack reaching the interface of the coating layer and the glass substrate. With the coating designed to not fail before the glass, such stress concentrations are avoided.

Fourth, the interface of the coating layer and the glass substrate may be carefully cleaned or otherwise made to have few if any third body debris (e.g., polishing agent, grease), which may otherwise locally decouple the coating layer and the glass substrate.

Lastly, the coating layer is applied carefully and consistently on the surface of the glass substrate, without internal inconsistency of the coating or local damage that may be caused by poor handling or inadvertent contact with tooling for example (cf. "Outliers" in FIG. 7 and corresponding text herein).

Applicants believe that a combination of the above phenomena and mechanical attributes of the glass and coating help the above-described glass-based assembly to achieve the substantial strength improvement. With that said, other phenomena may contribute to or achieve the observed result as furthers discussed herein.

According to an aspect of the present disclosure, a glass-based assembly includes a glass substrate and a coating layer laminated to the glass substrate. The glass of the glass substrate may be stiff and brittle and the glass substrate may be far thicker than the coating layer. However, ultimate strength of the glass substrate with the coating layer overlaying and laminated thereto is greater than that of the glass substrate alone. More specifically, among others disclosed herein, the present disclosures includes the following enumerated aspects:

An Aspect A1 of the present disclosure is glass-based assembly comprises a glass substrate and a coating layer. The glass substrate comprises a surface, where glass of the glass substrate breaks when stretched beyond a fracture strain of the glass. The coating layer is coupled to the glass substrate, where the coating layer overlays at least a portion of the surface of the glass substrate. Stretching of coating of the coating layer to the fracture strain of the glass of the glass substrate does not fracture the coating. Ultimate strength of the glass substrate with the coating layer overlaying and coupled thereto is greater than that of the glass substrate alone, without the coating layer.

An Aspect A2 is the glass-based assembly of Aspect A1, where, over a range of strain produced by tensile loading the glass of the glass substrate from 0 to 500 kPa, the coating of the coating layer has a modulus of elasticity that is less than 1.1 times that of the glass of the glass substrate.

An Aspect A3 is the glass-based assembly of either Aspect A1 or A2, where the glass substrate has first and second major surfaces facing away from one another, a body of the glass between the first and second major surfaces, and an edge extending between the first and second major surfaces and defining a perimeter of the first and second major surfaces, where the glass substrate has a thickness defined as a distance between the first and second major surfaces orthogonal to the first major surface in a direction through the body, where the coating layer has a thickness defined as a distance orthogonal to the first major surface of the glass substrate and fully through the coating layer, and where the thickness of the glass substrate is at least 50 times greater than that of the coating layer.

An Aspect A4 is the glass-based assembly of any one of Aspects A1 to A3, where ultimate strength of the glass substrate with the coating layer overlaying and coupled thereto is at least 20 MPa greater than that of the glass substrate alone, without the coating layer.

An Aspect A5 is the glass-based assembly of any one of Aspects A1 to A4, where the glass of the glass substrate is stiff, having a modulus of elasticity such that when 500 kPa of tensile stress is applied to the glass, the glass strains no more than 5.5 μm/m but at least 3.1 μm/m.

An Aspect A6 is the glass-based assembly of any one of Aspects A1 to A5, where the glass of the glass substrate is brittle, having a fracture toughness less than 0.8 MPa·m$^{1/2}$.

An Aspect A7 is the glass-based assembly of any one of Aspects A1 to A6, where, over the range of strain, the coating of the coating layer has average modulus of elasticity that is at least 0.3 times that of the glass of the glass substrate.

An Aspect A8 is the glass-based assembly of any one of Aspects A1 to A7, where the coating of the coating layer and the glass of the glass substrate have a mismatch in modulus of elasticity such that a difference in modulus of elasticity of the coating of the coating layer and that of the glass of the glass substrate, over the range of strain, is at least 20 GPa.

An Aspect A9 is the glass-based assembly of any one of Aspects A1 to A8, where the glass of the glass substrate has a modulus of elasticity such that when 500 kPa of tensile stress is applied to glass thereof, the glass stretches no more than 5.1 μm but at least 3.5 μm.

An Aspect A10 is the glass-based assembly of any one of Aspects A1 to A9, where stretching of the coating of the coating layer to the fracture strain of the glass of the glass substrate is within an elastic regime of the coating.

An Aspect A11 is the glass-based assembly of any one of Aspects A1 to A10, where the thickness of the coating layer is less than 2 μm, while the thickness of the glass substrate is greater than 400 μm.

An Aspect A12 is the glass-based assembly of any one of Aspects A1 to A11, where at zero strain or flexing of the glass-based assembly, stress in the coating layer is zero or compressive.

An Aspect A13 is the glass-based assembly of any one of Aspects A1 to A12, where the glass of the glass substrate comprises an oxide as a greater mol % constituent thereof than silica.

An Aspect A14 is the glass-based assembly of any one of Aspects A1 to A13, where the coating layer blocks water vapor in air at 250 C, 70% relative humidity, standard atmospheric pressure from reaching the glass substrate underlying the coating layer.

An Aspect A15 is the glass-based assembly of any one of Aspects A1 to A14, where stretching the glass-based assembly to the fracture strain of the glass of the glass substrate does not delaminate the coating layer from the glass substrate.

An Aspect B1 is a glass-based assembly, comprising a glass substrate and a coating layer coupled to the glass substrate. The glass substrate comprises a surface, where glass of the glass substrate breaks when stretched beyond a fracture strain thereof. The coating layer overlays at least a portion of the surface of the glass substrate. Over a range of strain produced by tensile loading the glass of the glass substrate from 0 to 500 kPa, the coating of the coating layer has a modulus of elasticity that is less than 1.1 times that of the glass of the glass substrate. Ultimate strength of the glass substrate with the coating layer overlaying and coupled to the glass substrate is greater than that of the glass substrate alone, without the coating layer.

An Aspect B2 is the glass-based assembly of Aspect B1, where the coating layer blocks water vapor in air at 25° C., 70% relative humidity, standard atmospheric pressure from reaching the glass substrate underlying the coating layer.

An Aspect B3 is the glass-based assembly of either Aspect B1 or B2, where stretching the glass-based assembly to the fracture strain of the glass of the glass substrate does not delaminate the coating layer from the glass substrate.

An Aspect C1 is method of making a glass-based assembly. The method comprises coating a glass substrate to form a coating layer overlaying and coupled to the glass substrate. Stretching of coating of the coating layer to the fracture strain of glass of the glass substrate does not fracture the coating. Ultimate strength of the glass substrate with the coating layer overlaying and coupled to the glass substrate is greater than that of the glass substrate alone, without the coating layer.

An Aspect C2 is the method of Aspect C1, further comprising flexing the glass substrate with the coating layer overlaying and coupled thereto, to insert the glass substrate into a device, wherein the coating remains coupled to the glass substrate when flexed and operates within an elastic regime of the coating of the coating layer during the flexing.

Additional features and advantages are set forth in the detailed description that follows, and in part will be readily apparent to those skilled in the art from the description or recognized by practicing the technology as described in the written description and claims hereof, as well as the appended drawings. It is to be understood that both the foregoing general description and the following detailed description are merely exemplary and are intended to provide an overview or framework to understand the nature and character of the claims.

BRIEF DESCRIPTION OF THE FIGURES

The accompanying figures are included to provide a further understanding and are incorporated in and constitute a part of this specification. The drawings of the figures illustrate one or more aspects of the present disclosure, and together with the detailed description explain principles and operations of the various aspects. As such, the disclosure will become more fully understood from the following detailed description, taken in conjunction with the accompanying figures, in which.

DETAILED DESCRIPTION

Before turning to the following detailed description and figures, which illustrate aspects of the present disclosure in detail, it should be understood that the present inventive technology is not limited to the details or methodology set forth in the detailed description or illustrated in the figures. For example, as will be understood by those of ordinary skill in the art, features and attributes associated with an aspect shown in one of the figures or described in the text relating to an aspect may be applied to another aspect shown in another of the figures or described elsewhere in the text.

Figure 1:
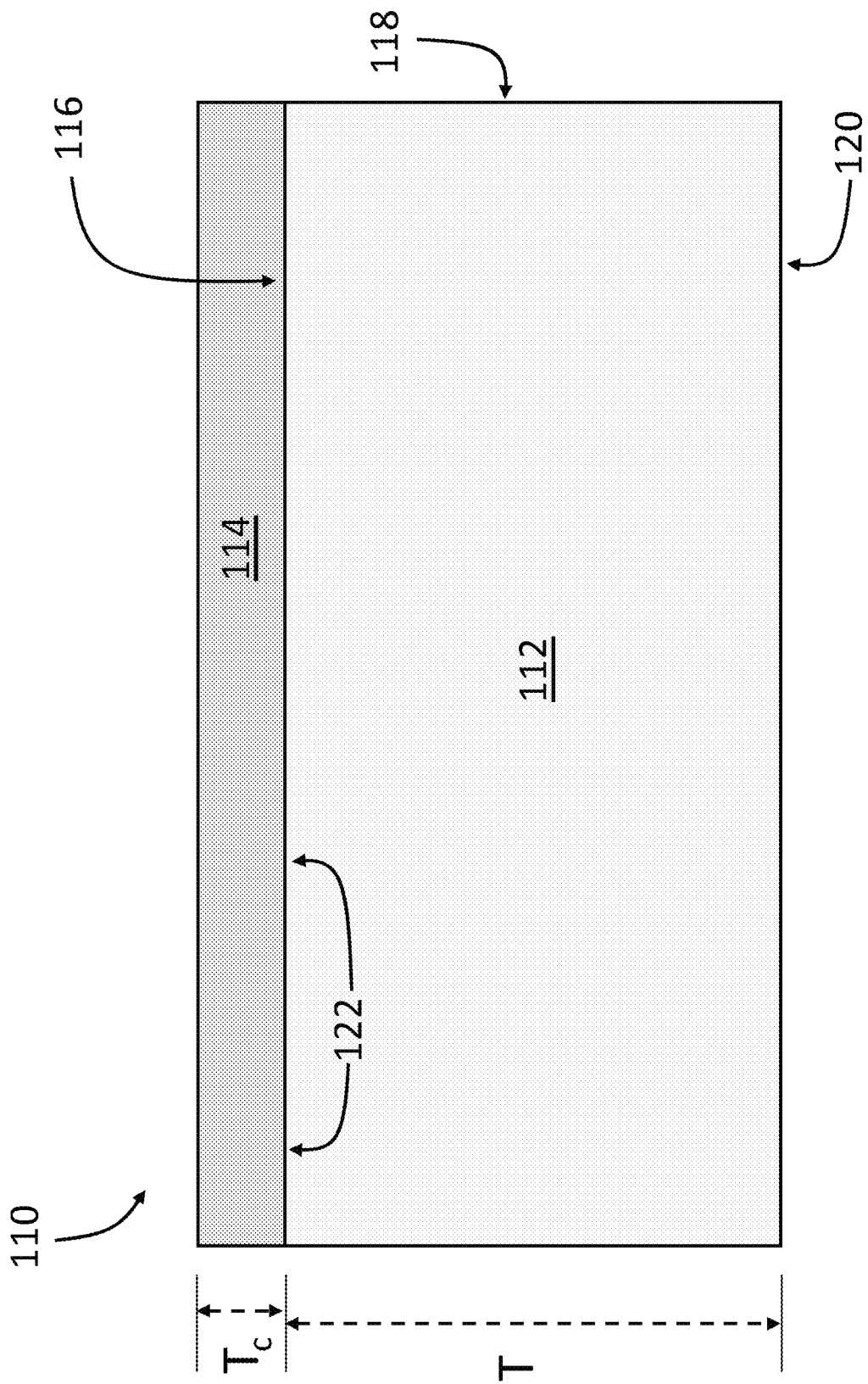
FIG. 1 is a schematic view of a conceptual glass-based assembly according to an aspect of the present disclosure.

Referring to FIG. 1, a glass-based assembly 110 includes a glass substrate 112 and a coating layer 114 overlaying (e.g., extending over, blanketing) and laminated to the glass substrate 112 (shown from the side in FIG. 1). More specifically, the glass-based assembly 110 is in the form of a generic coated sheet or wafer of glass, but many forms of glass-based assemblies are contemplated, such as coated windows, panels, tubes, containers, spheres, and fibers for example. Further, while glass of the glass substrate 112 may be amorphous, Applicants contemplate glass-ceramic glass substrates may benefit from coatings as disclosed herein, or even ceramic substrates may so benefit, such as lithium garnet solid electrolyte sheets for example, as an aspect of the present disclosure.

The glass-based assembly 110 may consist of the glass substrate 112 and the coating layer 114, or consist essentially of the glass substrate 112 and the coating layer 114, such as if the glass-based assembly 110 includes an adhesion promoter therebetween. However, such a glass-based assembly 110 may then be integrated in other devices and assemblies, such as glasses, optical equipment, windows, displays, containers, architectural panels, etc. With that said, Applicants contemplate that the glass-based assembly 110 may comprise the glass substrate 112 and coating layer 114, and the glass-based assembly 110 may also include other elements, such as decorative paint, conductive vias, etc. according to an aspect of the present disclosure.

While the glass-based assembly 110 includes the coating layer 114 on a first major surface 116, and not on edges 118 or a second major surface 120 of the glass substrate 112, the present disclosure is not so limited. According to aspect, first and second major surfaces 116, 120 may be overlaid with coating layers (e.g., coating layer 114) and/or edges 118 may be so coated. Applicants contemplate coatings as disclosed herein may also be sandwiched between glass, such as in a laminated glass assembly (e.g., windshield, sunroof, windows, laminated glass panels; see, e.g., glass-based assembly 810 of FIG. 8), where an interior layer of the laminate and/or exterior coating layers have attributes as disclosed herein. Coatings between glass in a laminate may be different in composition, geometry, etc. than coatings on exterior surfaces of such assemblies.

As indicated above, according to an aspect of the present disclosure, the coating layer 114 is overlaying the glass substrate 112. The coating layer 114 may be mostly (>50% in terms of area) overlaying the glass substrate 112, such as >80% in terms of area, such as covering >90% of area of a major surface 116, 120 of the glass substrate 112, >99% of the area, or even fully overlaying the glass substrate 112, or just a side thereof, such as so overlaying the first major surface 116 (as shown in FIG. 1), the second major surface 120, and/or the edges 118. The overlaying may include direct contact between the coating layer 114 and glass substrate 112, or may include an intermediate material, such as an adhesion promoter (e.g., 3M Adhesion Promotor 111, Loctite Primer SF 7471, Dow Corning Primer P5201) sandwiched between the coating layer 114 and the glass substrate 112, for example. The major surface(s) 116, 120, and/or edges 118 may be treated (e.g., ion-exchanged, oxidized, protonated by acid, etc.) to better bond the coating layer 114 or for other purposes (e.g., further strengthening, aesthetics).

According to an aspect of the present disclosure, glass of the glass substrate 112 (i.e. independent of the coating layer 114; e.g. amorphous glass, glass-ceramic) has elasticity, where the glass may be stressed, correspondingly deform (e.g. stretch), and then generally return to an original geometry once the stress is released. Applicants acknowledge that the glass may not be perfectly elastic and that there may be hysteresis or some relatively small amount of plastic deformation, which may become more apparent for example if stresses are cyclical, potentially leading to fatigue effects.

While the glass of the glass substrate 112 has elasticity, if the glass of the glass substrate 112 is stretched (i.e. strained) enough, then the glass will break at "fracture strain" (also called "strain to failure," "failure strain," "maximum strain"). Fracture strain of the glass, as used herein, refers to strain at failure for a statistically significant population of representative samples, with a default where the strain at failure is the "average strain," where 50% of the population fails at strains greater than the average strain, and 50% lesser (but alternatively other percentages may be claimed as supported by the present disclosure, such as the B10 strain of the population at failure). Other disclosure herein relates to the "B10 strain," where 90% of the population fails at strains greater than the B10 strain. The population should be statistically significant, such as default of 30 samples unless otherwise specified, such as if population of 100 samples, 200 samples, 500 samples, etc. is specified in claims hereof for greater confidence, or such as 20 samples or 15 samples if less confidence is required. Clearly in addition to composition, the population of samples should have similar surface finish/roughness (e.g. default of Ra<1 nm, as discussed below) to that of the glass substrate.

According to an aspect of the present disclosure, the coating of the coating layer 114 is a coating that has fracture strain greater than that of the glass of the glass substrate 112. Stretching of the coating of the coating layer 114 to the fracture strain of the glass of the glass substrate 112 does not fracture the coating, such as on average for a statistically significant population as described above. As such, all things being equal, when increasingly strained, such as via a ring-on-ring test (see ASTM C1499), the coating layer 114 holds together and does not crack or fracture prior to failure of the glass substrate 112. By contrast, coatings with a fracture strain less than that of the glass substrate 112, especially those substantially less, may crack well before the glass of the glass substrate 112 would crack, and cracks in the coating may weaken underlying glass by providing sites for stress concentrations at the coating-to-glass interface 122, where a crack passing through the coating layer 114 reaches the glass substrate 112.

According to an aspect of the present disclosure, the coating layer 114 is laminated to the glass substrate 112, meaning that the coating layer 114 is coupled to, such as physically bonded to or adhered to the glass substrate 112, which may again include an intermediate adhesion promoter or adhesive for example. According to an aspect, the lamination may be consistent across a full interface 122 between the glass substrate 112 the coating layer 114, meaning that there are not delaminated areas or patches of the glass substrate 112 overlaid by the coating layer 114. According to an aspect of the present disclosure, bonding is such that when stretched to the fracture strain of the glass of the glass substrate 112, the coating layer 114 does not delaminate from the glass substrate 112, such as on average in a statistically significant population as described above. Instead, the coating layer 114 remains fully attached to the glass substrate 112, as just described.

Although not drawn to scale, according to an aspect of the present disclosure, the glass substrate 112 has a thickness T, defined as a distance orthogonal to the first major surface 116 and through a body of the glass substrate 112, between the first major surface 116 and the second major surface 120. While the thickness T is constant horizontally across the glass-based assembly 110 in FIG. 1, glass-based assemblies may have variable thicknesses, such as for optical or medical equipment (e.g., optical lens curved to direct light; thicker corners or neck of medicinal container), where the value of thickness T is present among other thicknesses.

Figure 2:
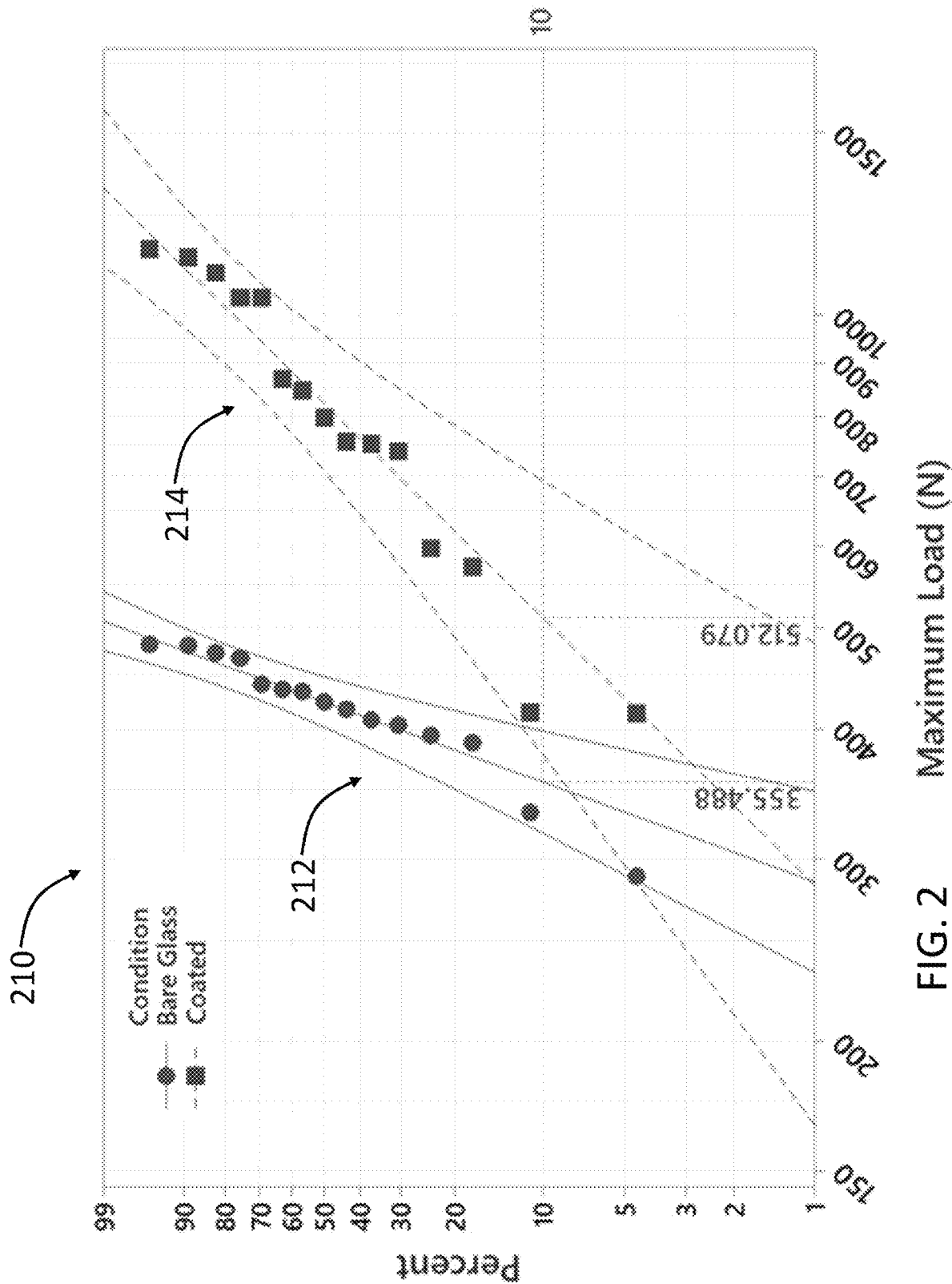
FIG. 2 is a Weibull plot of maximum load (N), or load at fracture, of bare and coated glass substrates according to an aspect of the present disclosure.

As indicated in the Summary above, Applicants were initially surprised to find a coating layer improving strength of a glass substrate (see generally coating layer 114 and glass substrate 112 of glass-based assembly 110 of FIG. 1), but investigated further. Referring now to FIG. 2, a plot 210 presents probability in percentage of maximum load (i.e. x-axis; aka load at failure), in terms of newtons, for a ring-on-ring test as indicated above (see ASTM C1499). Notably, a 30 mm diameter support ring and a 15 mm diameter loading ring were used to fracture circular wafers of glass with and without coating on a top side of the wafer. The maximum load in the plot 210 is the load at which the rings were pressed together when the glass wafer (bare 212 or coated 214) therebetween failed.

The plot 210 of FIG. 2 is more specifically a Weibull plot corresponding to a 95% confidence interval. Glass wafers resulting in the data of FIG. 2 were 300 mm in diameter and 0.6 mm in thickness T (see FIG. 1), had a modulus of elasticity of 116 GPa (for at least a portion of their stress-strain response) without coating, and the coating itself had a modulus of 80 GPa and coating thickness $T_C$ (see FIG. 1) of about ⅔ μm in total. Also the glass wafers were a brittle high-index glass (specifically in terms of oxide constituents, 33 mol % $B_2O_3$, 20 mol % $La_2O_3$, 15 mol % $Nb_2O_5$, 9 mol % $TiO_2$, 7 mol % $ZrO_2$, and 16 mol % $WO_3$) and the coating was 13 alternating sub-layers of oxides of tantalum and silicon (e.g., $Ta_2O_5$, $SiO_2$) applied by evaporative coating, designed to reduce reflection of light upon the underlying surface of the glass substrate (see generally major surface 116 as shown in FIG. 1).

Although benefits disclosed herein may stem from mechanical interactions and behaviors of the glass substrate 112 and coating layer 114; non-silicate glasses (e.g., phosphate glasses, chalcogenide glasses, borate glasses) may particularly benefit from the technology disclosed herein. Just to clarify, "phosphate" glasses are those where the primary glass forming oxide is $P_2O_5$, such as instead of silica for silicate glasses. "Chalcogenides" are glasses containing sulfur, selenium, or tellurium (e.g., sulfur-based). $SO_2$ (+$SO_3$) may be a major constituent-such as greater than 2 mol %, 5 mol %, 8 mol %, 10 mol % for example, as opposed to simply being included for fining. The example glass used in FIG. 2 specified above is accordingly a borate glass with boria as the primary glass forming oxide. According to an aspect of the present disclosure, the glass has less than 20 mol % silica as a constituent thereof, such as less than 0.5 mol % silica. Such glasses may be more brittle and/or less tough than other glasses, such as silicates or aluminosilicates for example.

According to an aspect of the present disclosure, glass of the glass substrate 112 is brittle, having a fracture toughness less than 0.9 MPa·m$^{1/2}$, such as less than 0.8 MPa·m$^{1/2}$, such as less than 0.75 MPa·m$^{1/2}$, such as less than 0.7 MPa·m$^{1/2}$, and/or at least 0.4 MPa·m$^{1/2}$ such as at least 0.5 MPa·m$^{1/2}$. However, Applicants contemplate glasses with other fracture toughness values may likewise benefit from the present teachings.

A major surface of the glass substrates (see glass substrate 112 of FIG. 1), and more specifically the glass wafers as used for the testing leading to FIG. 2 and according to an aspect of the present disclosure, have an area of at least 500 mm$^2$ such as at least 1000 mm$^2$ such as at least 5000 mm$^2$, such as at least 10,000 mm$^2$, such as at least 20,000 mm$^2$, such as at least 50,000 mm$^2$, and/or no more than 10 m$^2$, such as no more than 1 m$^2$, such as no more than 0.5 m$^2$, such as no more than 0.25 m$^2$, such as no more than 100,000 mm$^2$. However, other surface areas are contemplated. Such a major surface need not be flat, as with the glass wafers. For example, Applicants contemplate curved windows and displays benefitting from the technology disclosed here. Such curved surfaces have a radius of curvature, as opposed to being flat with infinite radius.

Thickness T of the glass substrate, such as those as used for FIG. 2, is at least 20 μm, such as at least 30 μm, such as at least 50 μm, such as at least 80 μm, such as at least 100 μm, such as at least 150 μm, such as at least 250 μm, such as at least 400 μm, such as at least 500 μm, and/or no more than 5 cm, such as no more than 2 cm, such as no more than 1.5 cm, such as no more than 1 cm, such as no more than 8 mm, such as no more than 5 mm, such as no more than 3 mm, such as no more than 2 mm, such as no more than 1 mm, such as no more than 0.8 mm. However, other thicknesses T are contemplated.

Thickness $T_C$ of the coating layer (see coating layer 114 of FIG. 1), such as the coating layers used for the testing leading to FIG. 2, is at least 20 nm, such as at least 30 nm, such as at least 50 nm, such as at least 80 nm, such as at least 100 nm, such as at least 150 nm, such as at least 250 nm, such as at least 400 nm, such as at least 500 nm, and/or no more than 15 μm, such as no more than 12 μm, such as no more than 1 μm, such as no more than 5 μm, such as no more than 3 μm, such as no more than 2 μm, such as no more than 1 μm, such as no more than 0.8 μm. However, other thicknesses $T_C$ are contemplated.

According to an aspect of the present disclosure, the thickness T of the glass substrate 112 is far greater than the coating thickness $T_C$. More specifically, according to an aspect of the present disclosure, the thickness T of the glass substrate 112 is at least 20 times greater than the coating thickness $T_C$ of the coating layer 114, such as at least 50 times greater, such as at least 80 times greater, such as at least 100 times greater, such as at least 200 times greater, such as at least 400 times greater, such as at least 500 times greater, and/or no more than 1E6 times greater. However, other differences between thicknesses T and $T_C$ are contemplated, such as thickness T less than 20 times thickness $T_C$.

Benefits of the present technology may not be particularly dependent on thickness T, but thicker glass substrates may experience less stress for a given load and therefore be less likely to fracture. With that said, the strengthening impact of the coating layer 114 relative to the proportional strength contribution provided by the coating layer 114 to the overall glass-based substrate is more surprising for thicker glass substrates 112 and highlights the synergistic effects of the coating layer 114 to strengthen the glass substrate 112. As demonstrated with examples disclosed herein, the coating layer 114 may have a coating thickness $T_C$ less than 1 μm for a glass substrate 112 more than 600 times thicker than the coating layer 114, but may still result in a strength increase of about 100 MPa!

Elastic modulus of the glass substrate, as used for FIG. 2, was greater than 60 GPa, such as greater than 80 GPa, such as greater than 100 GPa, such as greater than 110 GPa, and/or less than 160 GPa, such as less than 150 GPa, such as less than 130 GPa, such as less than 120 GPa. Accordingly, the glass of the glass substrate has a modulus of elasticity such that when 500 kPa of tensile stress is applied to the glass, the glass strains no more than 5.5 μm/m but at least 3.1 μm/m, such as no more than 5.2 μm but at least 4.3 μm.

By contrast, the elastic modulus of the coating of the coating layer (see coating layer 114) was less than 1.1 times that of the glass of the corresponding glass substrate over a common stress range (such as at some, most, or all stresses within an elastic regime of the respective material) or over a common amount of strain (such as an amount between 0 and the fracture strain of the glass of the glass substrate, on average; e.g., between strains of the glass corresponding to 0 and 500 kPa tensile load). In at least some such instances, an elastic modulus of the coating is less than that of the glass of the glass substrate, such as at least 10 GPa less, such as at least 20 GPa less, such as at least 30 GPa less and/or at least 0.1 times that of the glass of the glass substrate, such as at least 0.3 times that of the glass, such as at least 0.5 times that of the glass. While the coatings demonstrated in the examples have such attributes, other coatings such as silicon nitride may have higher moduli and not be so easily paired with glasses to achieve the combined assembly properties disclosed herein.

While the elastic modulus of the coating may be less than about 1.1 times the glass, the elastic modulus of the coating of a coating layer 114 should at least be stiff enough to sufficiently constrain cracks on a surface of the underlying glass substrate 112 in order to achieve strength improvements as disclosed herein. According to an aspect of the present disclosure, an elastic modulus of the coating of the coating layer 114 was at least 500 kPa, such as at least 1 GPa, such as at least 10 GPa, such as at least 20 GPa, such as at least 25 GPa, such as at least 50 GPa, such as at least 60 GPa, and/or no more than 150 GPa, such as no more than 130 GPa, such as no more than 110 GPa, such as no more than 100 GPa, such as no more than 90 GPa. However, other elastic moduli are contemplated.

According to an aspect of the present disclosure, at zero strain and/or flexing of the glass-based assembly 110, stress in the coating layer 114 is low, such as less than 100 MPa in tension, such as near zero or in compression. Put another way, the coating layer 114 may be largely free or fully free of residual stress (i.e. tension).

According to an aspect of the present disclosure, as the coating is in the coating layer 114 when laminated to the glass substrate 112, an elastic behavior regime of the coating fully overlaps a range of zero strain to fracture strain of the glass of the glass substrate 112. Accordingly, if the glass-based assembly 110 is stretched and relaxed without breaking the glass substrate 112, the coating layer 114 operates within the elastic regime thereof.

Figure 3A:
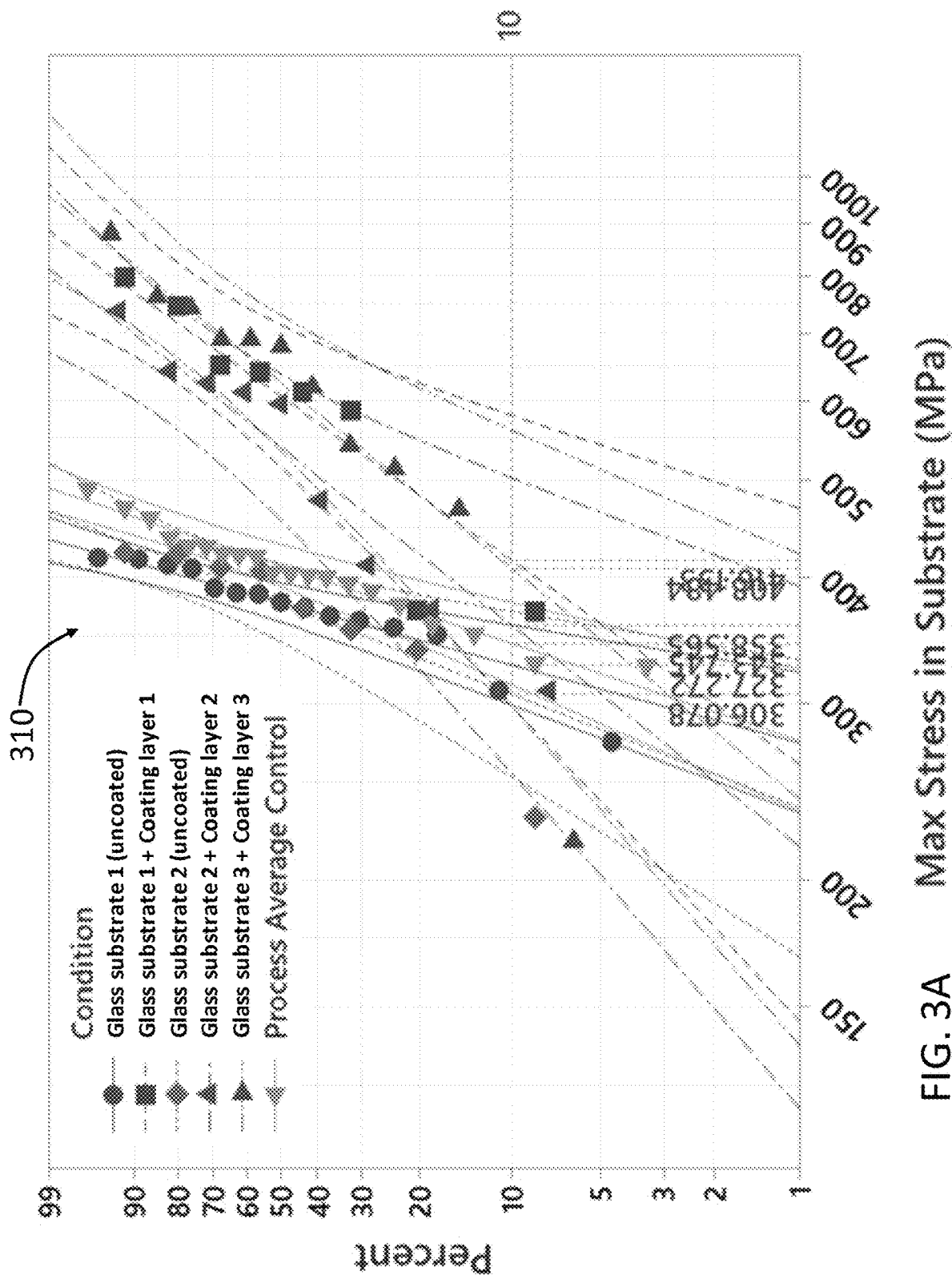
FIG. 3A is a Weibull plot of maximum stress (MPa), or ultimate stress, of bare and coated glass substrates according to an aspect of the present disclosure.

Load (x-axis) in FIG. 2 correlates to stress in the glass of a glass wafer being tested, and Applicants find use of a finite element model to convert load to stress presents a more accurate representation of ring-on-ring behavior than simply using beam theory to convert load to stress. For this test setup, using finite element analysis, Applicants estimate stress in the glass (bare or coated) in megapascals (MPa) to be the following complex polynomial function of applied load in kilograms force (kgf) between the rings:

$$y=-5.9695E-07x^4+3.1132E-04x^3-6.2971E-02x^2+1.0904E+01x+7.4458E-01,$$

where "y" is stress and "x" is force, where "E" means 'times 10 to the exponent power of the number following the E,' and where hat symbol ("^") means 'to the exponent power of the number following the hat symbol.' Referring now to FIG. 3, several glasses and coatings were tested, showing similar strengthening behavior by the combined glass substrate and coatings, as discussed above with respect to FIG. 2, but with the load converted to Max Stress (aka stress at failure, ultimate stress) in the substrate (coated or bare) using the above described finite element model. Similar to FIG. 2, plot 310 of FIG. 3 is a Weibull plot of 95% confidence interval with respect to ring-on-ring tests with the same size wafer samples. Brittle glass was again used, with "coating layer one" being 13 alternating sub-layers of oxides of tantalum and silicon applied via evaporative coating at about ⅔ μm thickness $T_c$ in total for the coating layer one, coating layer two being 7 alternating sub-layers of oxides of tantalum and silicon at about ⅓ μm thickness $T_C$, and coating layer three being simply layers of oxides of niobium and silicon applied via sputtering of correspondingly proportional thickness. All coatings in FIG. 3A were less than 1 micron in total thickness, very thin relative to 0.6 mm thick glass wafers. Other numbers of sub-layers are contemplated (e.g. 3, 5, 9, 11), including just one of any of the above coating materials as well as others having the mechanical properties disclosed.

Results of the tests showed the same significant strength improvement provided by the coating layers. In the plot 310, B10 ultimate strength values for the different glass-based assemblies were 306 MPa (rounded to the nearest integer) for uncoated glass substrate two, 327 MPa for uncoated glass substrate one, 344 MPa for "process average control," 359 MPa for glass substrate two coated with coating layer two, 408 MPa for glass substrate three with coating layer three, and 416 MPa for glass substrate one and coating layer one. Process average control was average from other tests using the same type of glass, but with better surface quality. Notably, the increase in B10 maximum strength (or ultimate strength) to the glass substrate provided by combining with the coating layer, as per the ring-on-ring tests, was at least 20 MPa, at least 30 MPa, at least 40 MPa, at least 50 MPa; and for coating and glass substrate one was also at least 60 MPa, at least 75 MPa, and/or no more than 10 GPa, such as no more than 5 GPa. Other strength changes are contemplated.

Figure 3B:
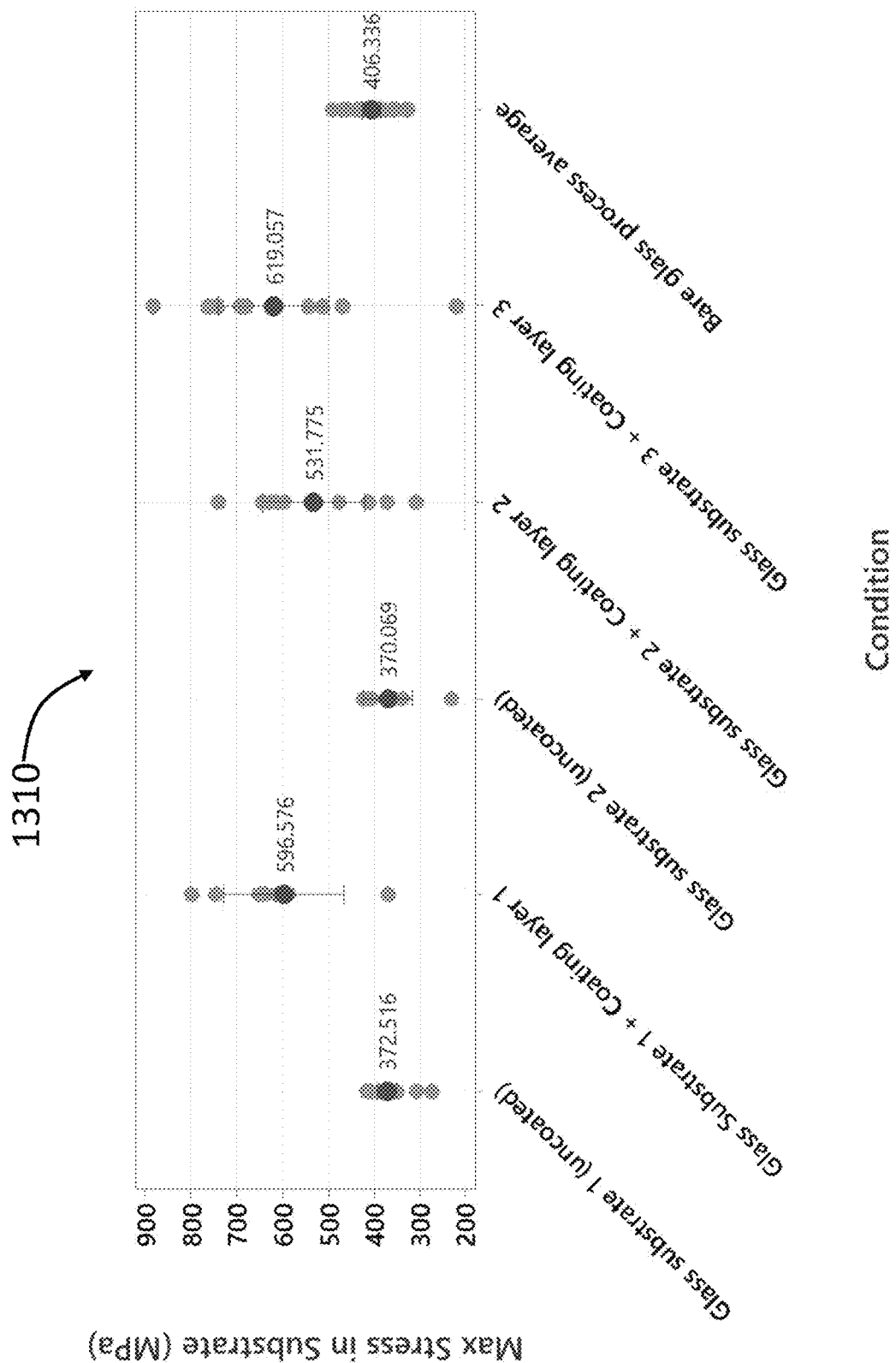
FIG. 3B is a plot of individual values of maximum stress (MPa), or ultimate stress, as a function of condition (e.g. bare and coated glass substrates) according to an aspect of the present disclosure.

In the plot 1310 of FIG. 3B, data of plot 310 is reorganized to show "Max Stress" or ultimate stress for each condition, with average ultimate stress specifically enumerated in the plot for each condition. Average ultimate strength values for the different glass-based assemblies were 370 MPa (rounded to the nearest integer) for uncoated glass substrate two, 373 MPa for uncoated glass substrate one (of similar composition to glass two), 406 MPa for "process average control," 532 MPa for glass substrate two coated with coating layer two, 619 MPa for glass substrate three with coating layer three, and 597 MPa for glass substrate one and coating layer one. Notably, the increase in average maximum strength (or ultimate strength) to the glass substrate provided by combining with the coating layer, as per the ring-on-ring tests, was at least 20 MPa, at least 50 MPa, at least 100 MPa, at least 150 MPa; and for coating and glass substrate one was also at least 200 MPa, at least 220 MPa, and/or no more than 10 GPa, such as no more than 5 GPa. Other strength changes are contemplated. Note "ultimate strength" or "average ultimate strength" means the average maximum strength from ring-on-ring testing as disclosed herein, from a statistically significant population, as specified herein, unless otherwise specified (e.g., B10 ultimate strength).

Surprisingly the coating thickness may not have been controlling in achieving the strength increases observed, as demonstrated with respect to the tests shown in FIGS. 3A-3B. While the fewer sub-layers of coating for glass substrate two with coating layer two had a less average maximum strength than glass substrate one with coating layer one (532 MPa versus 597 MPa), glass substrate 3 and coating layer 3 had the highest average maximum strength (619 MPa). Perhaps more important is an ability of the coating of the coating layer 114 to hold together and stay laminated to the glass substrate 112, constraining and insulating crack-initiation sites on the major surface 116 thereof, while the glass of the glass substrate 112 is loaded to failure.

Figure 4:
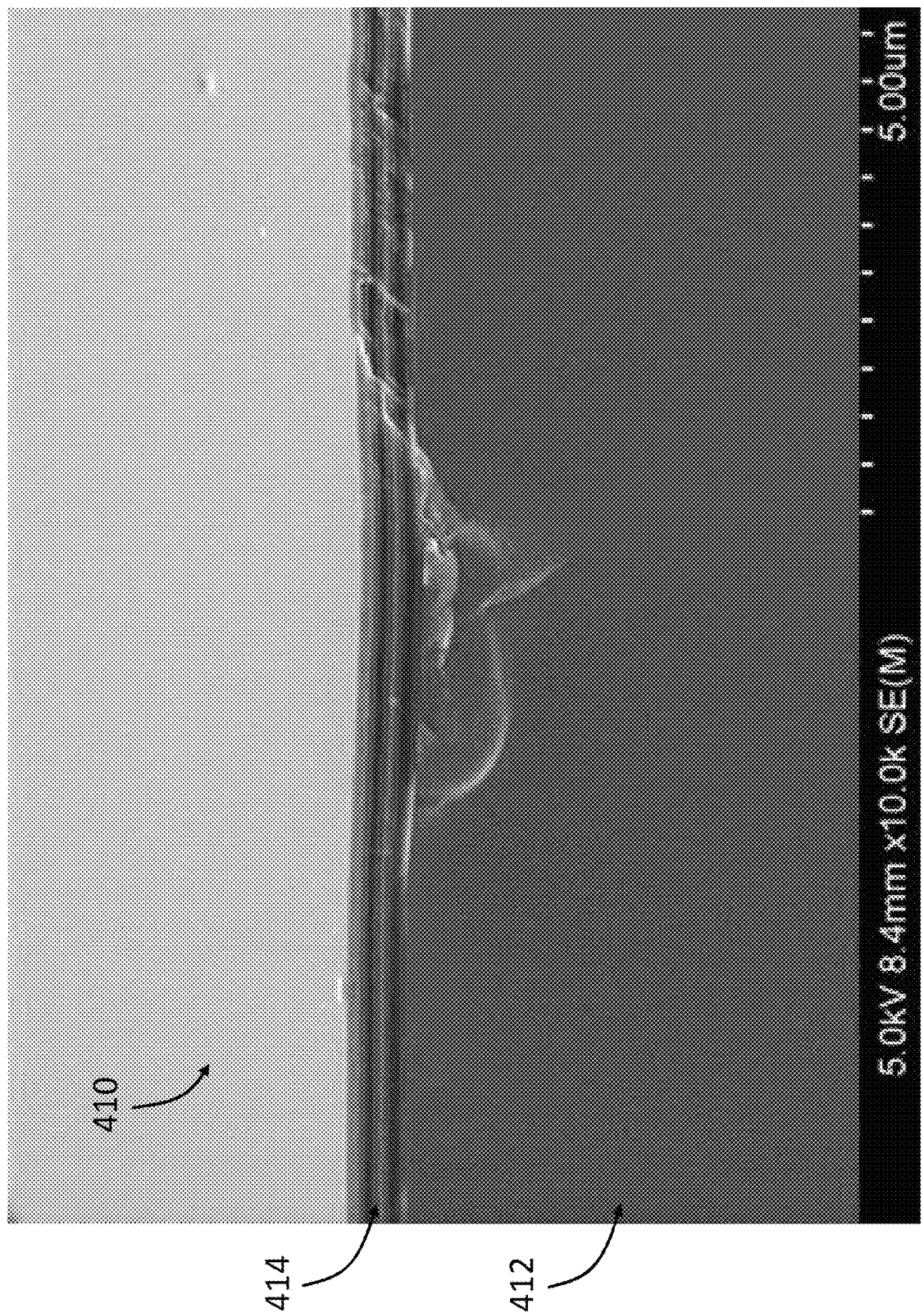
FIGS. 4-5 are a micrographs from a side view of glass-based assemblies showing a location from which cracks propagated according to an aspect of the present disclosure.
Figure 5:
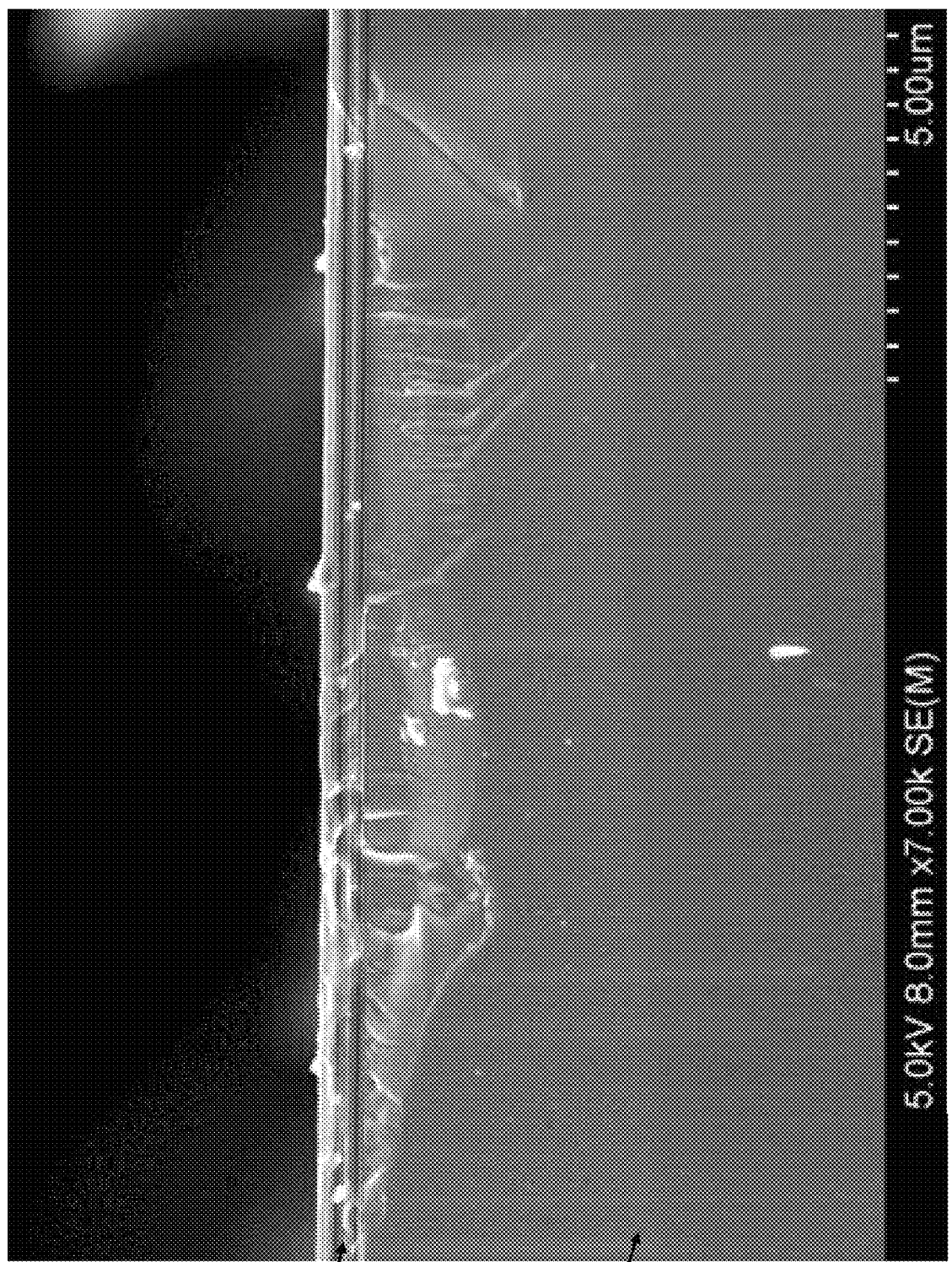

Referring now to FIGS. 4-7, Applicants analyzed physical microscopic results of the tests to better understand underlying mechanics. Referring first to FIGS. 4 and 5, each show a glass-based assembly 410, 510 including a coating layer 414, 514 overlaying and laminated to a glass substrate 412, 512. In each image, cracking from ring-on-ring testing has occurred. Upon close inspection of the crack geometry and direction of propagation, Applicants believe that cracks first initiated in the glass of the glass substrates 412, 512 and spread through the glass substrates 412, 512 before then fracturing the coating layers 414, 514. Also notably, even though the glass-based assemblies 410, 510 in FIGS. 4 and 5 have failed, the respective coating layers 414, 514 still appear fully laminated to the respective glass substrates 412, 512. The coating layer 414 in FIG. 4 is even deformed in the middle of the micrograph, bending to stay in contact with the underlying glass substrate 412, further evidencing strength of the bond therebetween.

Figure 6:
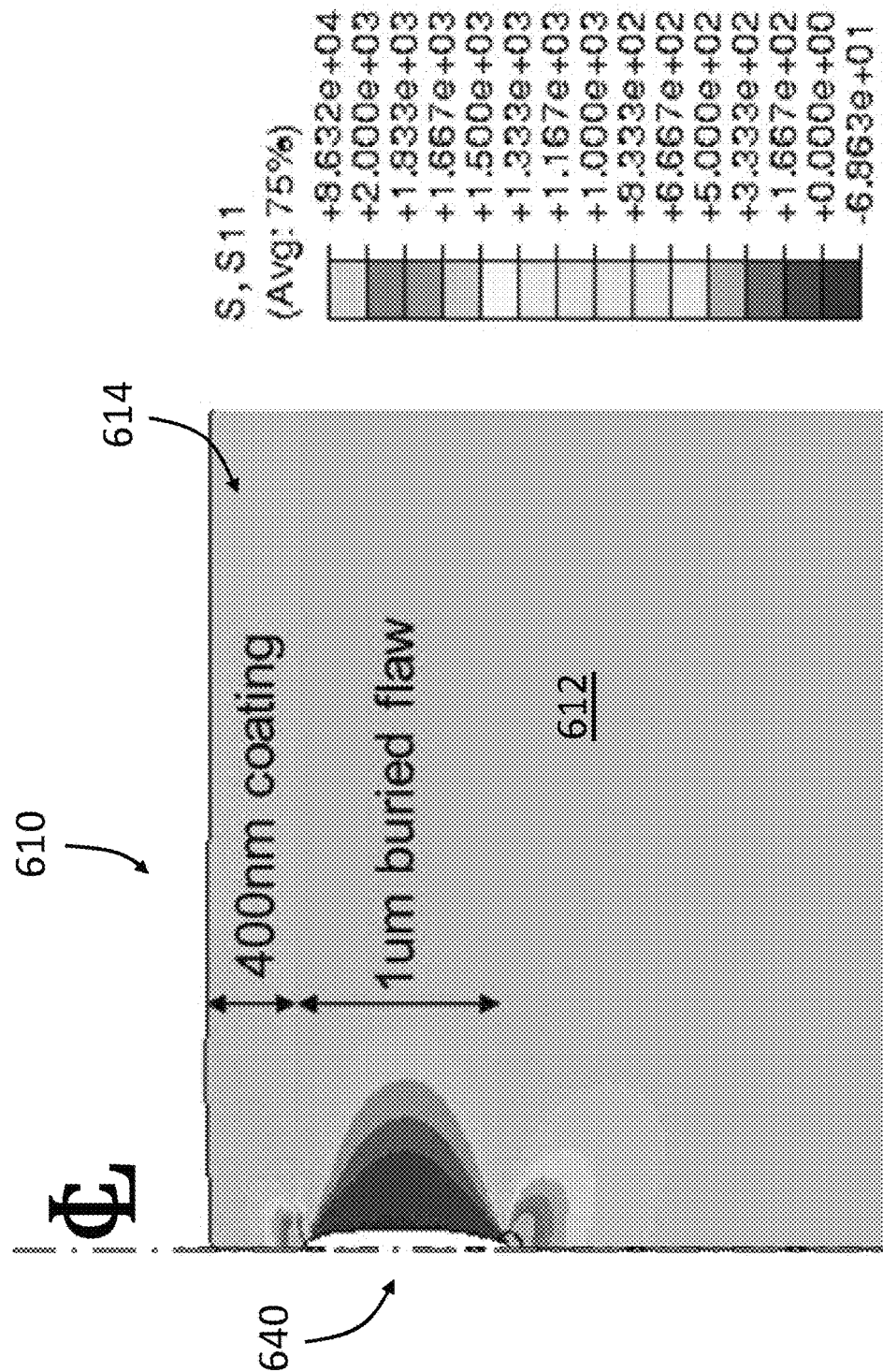
FIG. 6 is a portion of a finite element model including a buried flaw crack extending to a surface of a glass substrate, but beneath a coating layer according to an aspect of the present disclosure.

FIG. 6 shows a model 610 representative of finite element modeling of a glass-based assembly. The model 610 shows displacement when the model 610 is loaded away from the centerline (t). As per the model, a glass portion 612 has initially started to crack (i.e. "1 μm buried flaw"), near a surface 616 of the glass portion 612 and beneath a coating portion 614 ("400 nm coating"). This model 610 and loading may be representative of the glass-based assemblies 410, 510 just prior to the failures of FIGS. 4-5. Notably, in FIG. 6, deformation of crack 640 is exaggerated by a factor of 10 to visually emphasize sites of greater strain. Also, the model 610 in FIG. 6 is only a small corner portion of a larger finite element model, zoomed in to focus on the crack 640. As per the model 610, the coating portion 614 holds an end of the crack 640 together, and thereby decreases the ability of the crack 640 to grow as the glass portion 612 is stressed normal to the length of the crack 640 (along the centerline in FIG. 6). This modeling analysis aligns with explanations first presented above for the observed significantly increased strength of the glass-based assembly.

According to an aspect of the present disclosure, the coating layer 114 blocks water vapor in air at 250 C, 70% relative humidity, standard atmospheric pressure from reaching the glass substrate underlying the coating layer. More specifically the coating layer 114 blocks water vapor carried in the air from reaching crack tips and hastening failure of a glass-based assembly 110 as disclosed herein.

Figure 7:
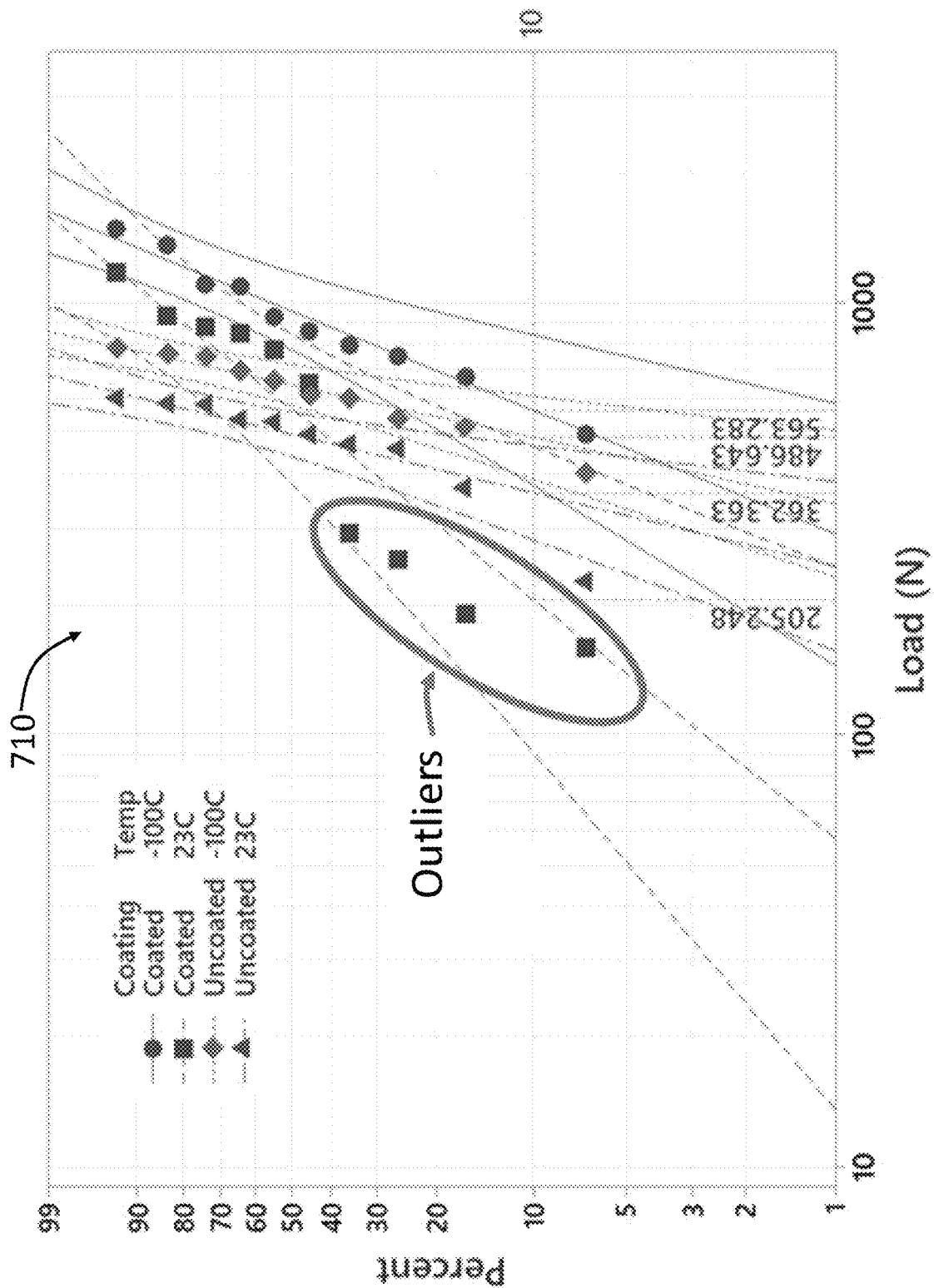
FIG. 7 is a Weibull plot of maximum load (N) of bare and coated glass substrates at room temperature (23° C.) and −100° C., a temperature corresponding to essentially zero water vapor carried in the air, according to an aspect of the present disclosure.

With FIG. 7, similar glass substrates to those of FIGS. 2-3, both coated and uncoated, were again tested, but this time at two different temperatures: room temperature (23° C.) and −100° C. The latter, very cold temperature corresponded to an air temperature carrying little if any water vapor. With this experiment, Applicants tried to determine impact of water vapor reaching exposed cracks, versus those that were shielded from water vapor by a coating layer. FIG. 7 accordingly presents a plot 710 of the results, again Weibull with 95% confidence. Applicants found perhaps some but little impact of water vapor in the air on crack growth with the borate glass. But functioning of a coating as disclosed herein to block water vapor from reaching a crack tip may show greater benefits in strength for glass-based assemblies using silicate glasses or glasses that quickly react to air or water vapor.

Notably a distinction between coated and uncoated glass wafers in FIG. 7 (divergent groups of extrapolated curves) is not as visually apparent in FIG. 7 as is the case for FIG. 2 or 3. This may be because four data points, circled and labeled "Outliers" in FIG. 7, corresponding to coated glass wafers at room temperature, failed well before expected, even before uncoated samples. Applicants believe these Outliers were failures due to scratch or contact damage on the respective coating layers. Put another way, in these Outlier samples, the coatings failed first-then scratch or contact damage in the coatings may have concentrated stresses on the underlying glass substrate. This is the weakening behavior that may be more expected for coatings of glass and serves as counterexamples to other data herein.

Figure 8:
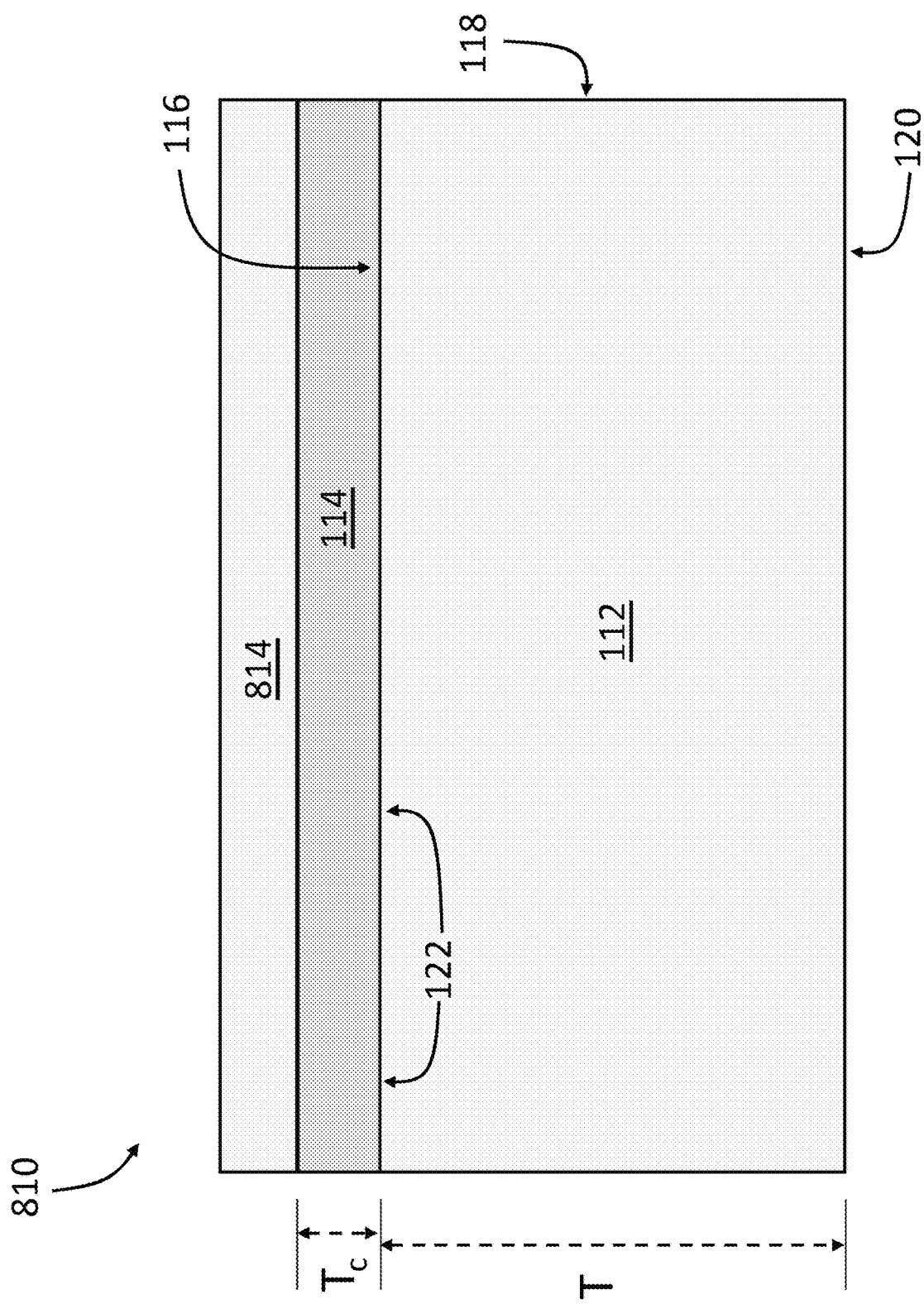
FIG. 8 is a schematic view of another conceptual glass-based assembly according to an aspect of the present disclosure.

Referring now to FIG. 8, a glass-based assembly 810 according to an aspect of the present disclosure has structure as described above with respect to FIG. 1, and additionally includes a layer 814. The layer 814 may be a second coating layer, such as of a hard, scratch-resistant coating, where fracture toughness and/or modulus of the layer 814 are greater than the coating layer 114, such as at least 20% greater, 50% greater. In such cases, the coating layer 114 may insulate the glass substrate 112 from cracks formed in the layer 814.

According to an aspect of the present disclosure, the layer 814 may alternatively be a glass layer, such as in a laminate structure as described above. The glass of the layer 814 may likewise differ from coating of the coating layer 114 in terms of mechanical properties, such as with respect to elasticity, ultimate strength, geometry, as has already been described with respect to the glass of the glass substrate 112 differing from the coating of the coating layer 114.

The test wafers (bare and coated) corresponding to tests discussed with respect to FIGS. 2-3 and 7, had comparable surface qualities. However, according to an aspect of the present disclosure, glass substrates, especially brittle and fragile glass substrates (e.g., high-index glasses), may be coated according to the disclosure provided herein, to increase strength of the glasses without the perhaps time consuming and tedious tasks of finely polishing surfaces thereof. Put another way, a coating layer overlaying and laminated to a glass substrate as disclosed herein may compensate for loss of strength of the glass substrate due to rougher surfaces thereof.

Figure 9:
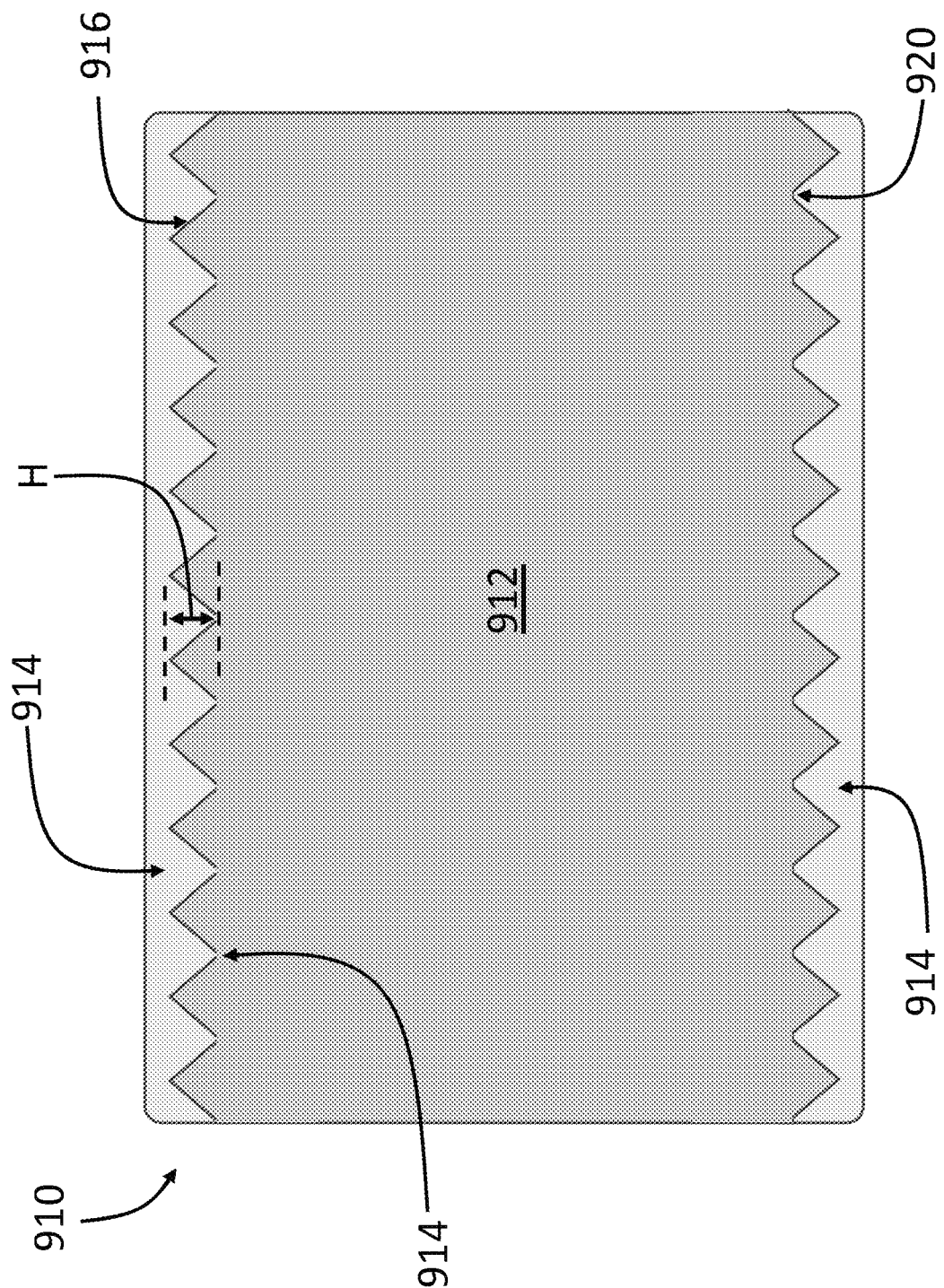
FIG. 9 is a schematic view of yet another conceptual glass-based assembly according to an aspect of the present disclosure.

Referring now to FIG. 9, a glass-based assembly 910 includes a glass substrate 912 and a coating layer 914 overlaying and laminated thereto. First and second major surfaces 916, 920 are roughly cut, such wire cut from a boule, perhaps with some lapping and/or polishing. However, the first and second major surfaces 916, 920 include striations 960 (aka grooves from abrasive wear). Such striations 960 may be a source of stress concentration, and may otherwise facilitate crack initiation and growth as the corresponding glass substrate 912 is loaded. However, coating layers 914 may oppose crack growth from the striations 960 by constraining an open end of such crack initiation sites.

As such, according to an aspect of the present disclosure, the glass substrate 912 as shown in FIG. 9 includes striations 960 that are visible at least upon microscopic inspection of the major surface(s) 916, 920. The striations 960 are elongate grooves, having a length at least 5 times a width thereof, where width is measured from local peak to adjacent local peak (e.g., >50 nm, such as >100 nm, such as >500 nm, such as >1 μm, and/or <1 mm, such as <500 μm, such as <200 μm, such as <100 μm, such as <50 μm) and length is the distance along the respective surface crosswise to width, having a length less than or equal to fully across the respective major surface 916, 920, but at least 5 times any of the width inequality dimensions just disclosed.

A difference in peak to valley height H of the striation(s) 960 may be greater than 50 nm, such as >75 nm, such as >100 nm, such as >500 nm, such as >1 μm, and/or less than 50 μm, such as <20 μm, such as <10 μm, such as <5 μm, as may be measured by optical profilometer. According to an aspect of the present disclosure, glasses that still benefit from the technologies disclosed herein have low roughness, such as Ra<50 nm, such as Ra<10 nm, such as Ra<5 nm, such as Ra<1 nm measured over one linear cm along a major surface. Further, according to an aspect of the present disclosure, two or more of the striations 960 adjacent to one another may be directed lengthwise in a common direction (e.g., generally parallel to one another). According to an aspect of the present disclosure, such a surface 916, 920 includes at least two striations 960 adjacent and commonly directed, such as at least 5, at least 10, at least 100, at least 500 such striations 960.

A less-polished surface (see generally surfaces 916, 920) may improve adhesion of the coating layer 914 to the surface 916, 920 of the glass substrate 912, portions of the coating layer 914 extending into grooves of the striations 960 may be anchored and less likely to slip apart or delaminate from the underlying glass substrate. In turn, preventing localized delamination may be a source of improved strength of the overall glass-based assembly 910. On a local surface level, locations where the coating layer 914 is bonded immediately adjacent to locations where the coating layer 914 is delaminated may provide discontinuity in stress, and stress concentrations on the major surface 916, 920, leading to increased chances of crack formation and failure at lesser ultimate load.

Figure 10:
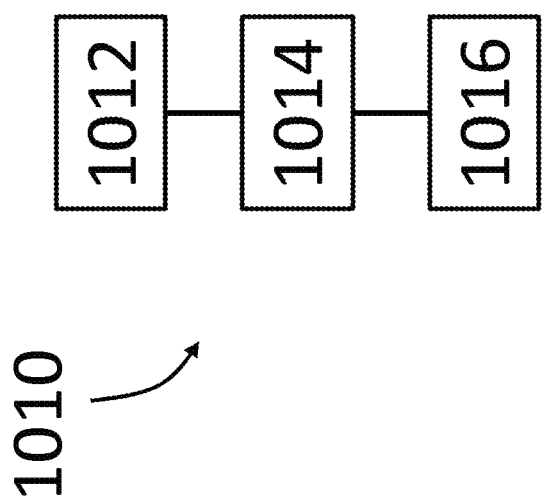
FIG. 10 is a flow chart of a method of making a glass-based assembly according to an aspect of the present disclosure.

Referring to FIG. 10, a method 1010 of making a glass-based assembly according to an aspect of the present disclosure may include a step 1012 of cutting a glass substrate (e.g., wafer, panel, cover) from a source of glass (e.g., boule, sheet, roll) as described above, where the glass substrate includes a glass as described herein (e.g., geometrically, elastically, above surface qualities).

The method 1010 further includes a step 1014 of coating the glass substrate with a coating layer as disclosed above, and thereby strengthening the glass substrate (see generally glass-based assembly 110 of FIG. 1 and corresponding glass substrate 112 and coating layer 114). Executing the step 1014 of coating the glass substrate at a proximate time (e.g., within one hour, 10 minutes, 5 minutes) and/or proximate location (e.g., within 1 km, such as within 500 m, such as within 100 m) to executing the step 1012 of cutting the glass substrate may be beneficial to subsequent handling and processing, especially for brittle, thin glasses described herein. For example, the method 1010 may further include a step 1016 of inserting the glass-based assembly (coating layer on glass substrate) into or on a device, such as a window frame, display housing, etc. This step 1016 of inserting may include flexing the glass-based assembly, where the coating remains fully laminated to the glass substrate when flexed and operates within the elastic regime of the coating material during the flexing.

Figure 11:
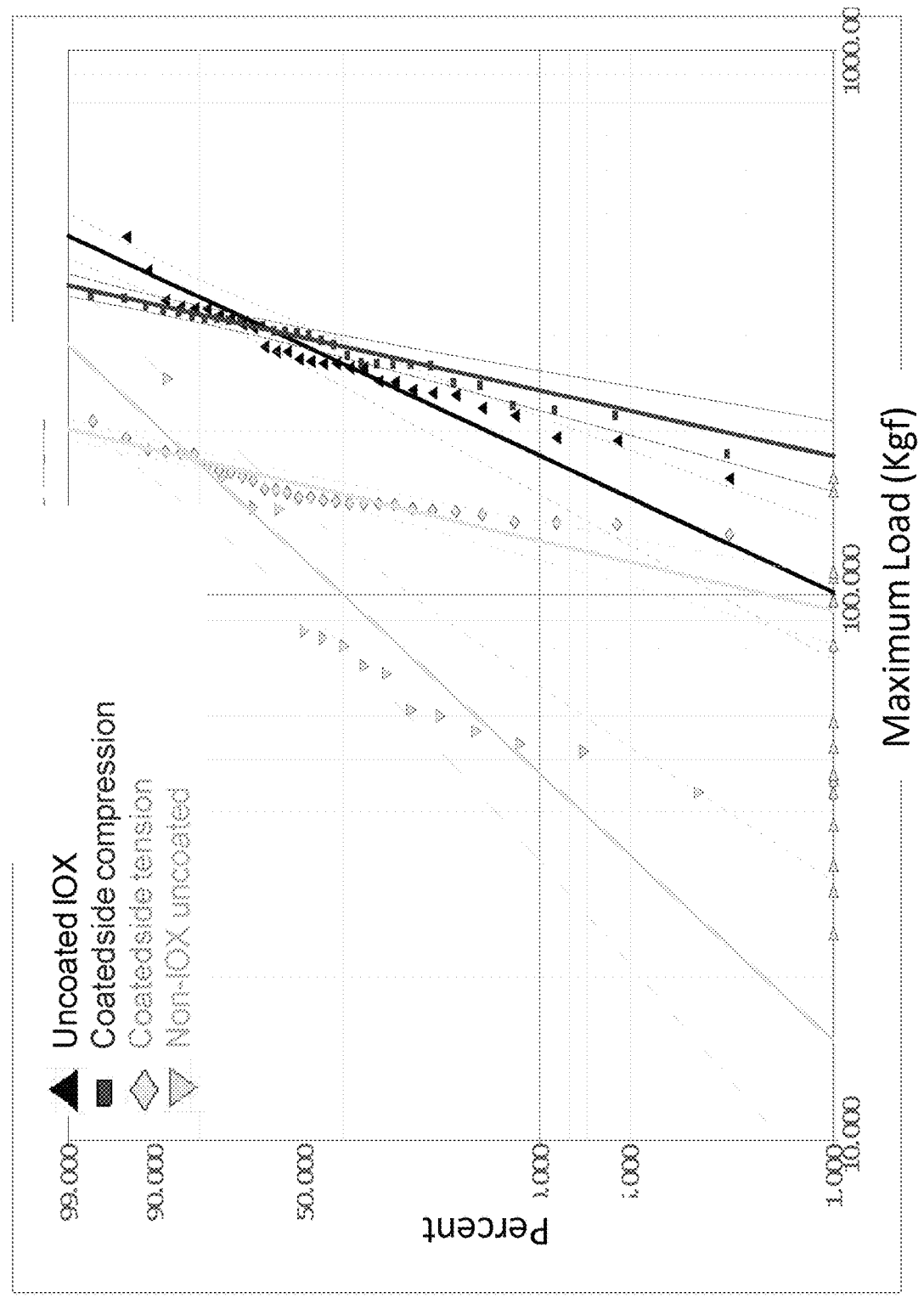
FIG. 11 is a Weibull plot of maximum load (Kgf), or load at fracture, of bare, ion-exchange, and coated glass substrates.

FIG. 11 is provided for further context. Substrates of CORNING® GORILLA® GLASS 3 were coated by a stack of alternating niobia and silica layers, similar to those disclosed above, and then loaded until failure in a ring-on-ring test setup. As shown, uncoated, non-ion-exchanged substrates failed at the lowest loads in FIG. 11. However, CORNING® GORILLA® GLASS 3 is typically a strong glass, at least in part because it may be strengthened by ion-exchange; and with respect to FIG. 11, all but the "non-iox uncoated" samples were ion-exchanged. Ion-exchanged but uncoated samples and samples with the coating-side in compression performed the best, and comparable to one another. However, as evidenced by the data in FIG. 11, samples with coated-side in tension (i.e. facing away from the smaller ring) clearly lost strength compared to uncoated substrates.

In contrast to glass-based assemblies discussed herein before FIG. 11, the glass-based assemblies of FIG. 11 were weakened with the coating, compared to uncoated glass. There may be a number of different reasons why the coated samples of CORNING® GORILLA® GLASS 3 in FIG. 11 (with the coated-side in tension) lost strength relative to the uncoated samples. For example, there may be an adverse chemical reaction between the coating the glass. The coating, if poorly constructed or applied, may include defects or particles that may apply a point load on the glass and a corresponding stress concentration. The glass itself may have pre-existing initiated cracks. However, without being bound to any theory and in view of the presently disclosed technology, Applicants believe that the weaking of the coated CORNING® GORILLA® GLASS 3 may at least in part be because the coating failed before the glass. Or, put another way, stretching of the coating of the coating layer to some strain less than the fracture strain of the CORNING® GORILLA® GLASS 3 of the glass substrate (in the ring-on-ring test), fractured the coating, possibly creating stress concentrations on the underlying glass at the coating-to-glass interface and/or where the coating no longer held together small nucleated cracks on the glass surface (in tension), which weakened the corresponding coated glass-based assembly.

Applicants note that without specifying a failure mode, placement of a coating on a glass substrate may increase "strength" of the combined assembly in various ways. For example, one way may be by strengthening the coated glass-based assembly with respect to scratching, such as if scratch formation is the failure mode. With that said, as disclosed above, Applicants herein refer to strength with respect to ring-on-ring performance, where the corresponding stress at failure is the ultimate strength, and where samples are strengthened with the coatings, as disclosed, by increasing the ultimate strength of the corresponding glass-based assembly with respect to a failure mode of fracture under ring-on-ring loading.

According to an aspect of the present disclosure, at least some glass substrates herein include small, nucleated cracks (or crack nucleation sites) on or near a surface thereof (e.g., within 10 μm of the surface of the glass substrate). The surface is coated as disclosed above, where the coating holds together an end of the nucleated cracks closest to the coating and mitigates propagation of the nucleated cracks. However, such nucleated cracks or crack nucleation sites may be very small and hard to detect, but may be evidenced by respective glass fracturing when loaded via ring-on-ring testing at an ultimate strength less than ideal when uncoated.

As indicated above, at zero strain and/or flexing of the glass-based assembly 110, stress in the coating layer 114 may be less than 100 MPa in tension, such as at or near zero or in compression. Applicants contemplate that having the coating in compression at zero strain and/or flexing of the glass-based assembly 110 may be beneficial to strength of the glass-bases assembly 110. Such compression may augment a strength increase of the glass-based assembly, in addition to other mechanisms disclosed herein, including where stretching of coating of the coating layer 114 to the fracture strain of the glass of the glass substrate 112 does not fracture the coating.

For example, the coating may have a compressive stress, such as a compressive stress of at least 20 MPa, at least 50 MPa, at least 100 MPa, at least 150 MPa and/or no more than 10 GPa, such as no more than 5 GPa, such as no more than 1 GPa. Placing the coating under a compressive stress at zero strain and/or flexing of the glass-based assembly 110 may facilitate use of stiffer coatings relative to the glass substrate 112, such as coatings having an elastic modulus greater than 0.8 times that of the glass and/or less than 1.1 times that of the glass, as disclosed above, or less than 1.5 times that of the glass, or less than 1.3 times that of the glass. The coating can be placed in compression during deposition, influenced by deposition temperature, deposition rate, deposition pressure, and deposition plasma energy.

A coating of a common or similar composition may have different physical attributes, such as hardness, fracture strain, elastic modulus, etc., depending upon a number of factors, such as chamber pressure, plasma energy, temperature during application of the coating, deposition rate, application technique, or various other factors as disclosed above, such as delaminations or patches of non-adhesion with the substrate, imperfections or defects in the coating, etc. Applicants find sputtering tends to give higher coating hardness than e-beam evaporation for example. Applicants measured a hardness value on the $Ta_2O_5/SiO_2$ coating stack disclosed above to be about 7.5 GPa. Accordingly, coatings disclosed herein have a hardness value greater than 4.5 GPa, such as greater than 5 GPa, greater than 6 GPa, and greater than 7 GPa, and/or less than 10 GPa, such as less than 9 GPa, less than 8 GPa. Hardness may be generally related to other physical attributes of a coating, but the degree of relation may correspondingly vary as a function of such factors as just disclosed.

As disclosed above, coating disclosed herein may have a particular elastic modulus relative to the respective glass substrate to form a glass-based assembly with increased ultimate strength. Example coatings include oxides, such as niobia, tantalum pentoxide, stacks thereof with intermediate silica layers, etc. Put another way, the coatings may largely be inorganic, because of physical attributes of such coatings. But polymeric coatings may be used to increase strength of a glass-based assembly as disclosed herein if such coatings have fracture strength and/or elasticity as disclosed above relative to the corresponding glass substrate.

Figure 12:
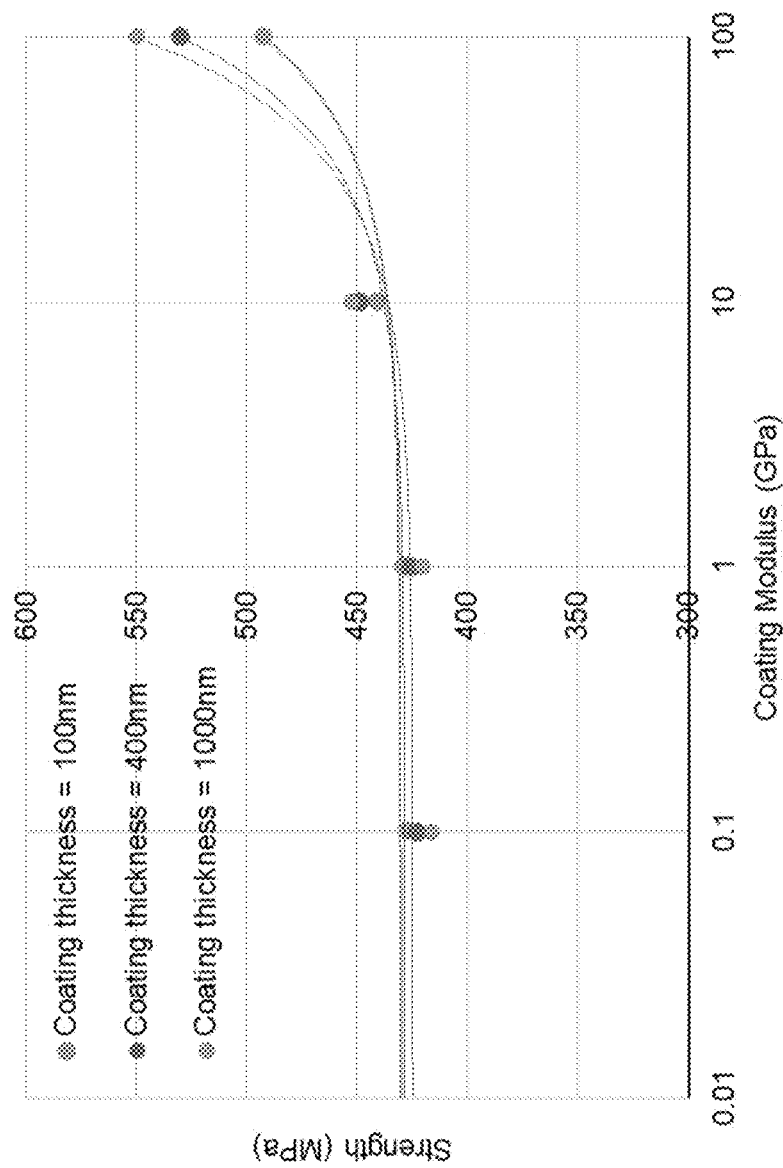
FIG. 12 is a plot from a finite element model of a glass-based assembly varying coating thickness and modulus, to see influence on strength.

Referring now to FIG. 12, Applicants have continued to explore other aspects of the presently disclosed technology, where in FIG. 12 modeling compares influence of coating modulus and coating thickness on strengthening effect as disclosed above for a common glass-based assembly with glasses as disclosed above (e.g., brittle). Accordingly, the amount of strengthening of such a glass-based assembly may plateau once the coating modulus is decreased below about 5 GPa, as shown in FIG. 12, somewhat regardless of coating thickness. As such, for glasses having a modulus greater than about 90 GPa, for coatings of thickness of at least about 100 nm, the coating modulus is at least 10 GPa, such as at least 15 GPa, but still has a fracture strain that allows for stretching of the coating of the coating layer to the fracture strain of the glass of the glass substrate without fracturing of the coating. Notably Applicants find use of finite element modeling of the ring-on-ring system, in combination with empirical measurements, helps to provide useful insight into stress and loading of the glass-based assemblies, such as helping to convert load at failure to stress at failure (see generally FIGS. 2-3 and corresponding text), especially for particularly thin glass substrates as disclosed above, such as those that may undergo large flexure and no longer fall within a regime of linear elasticity theory.

Figure 13:
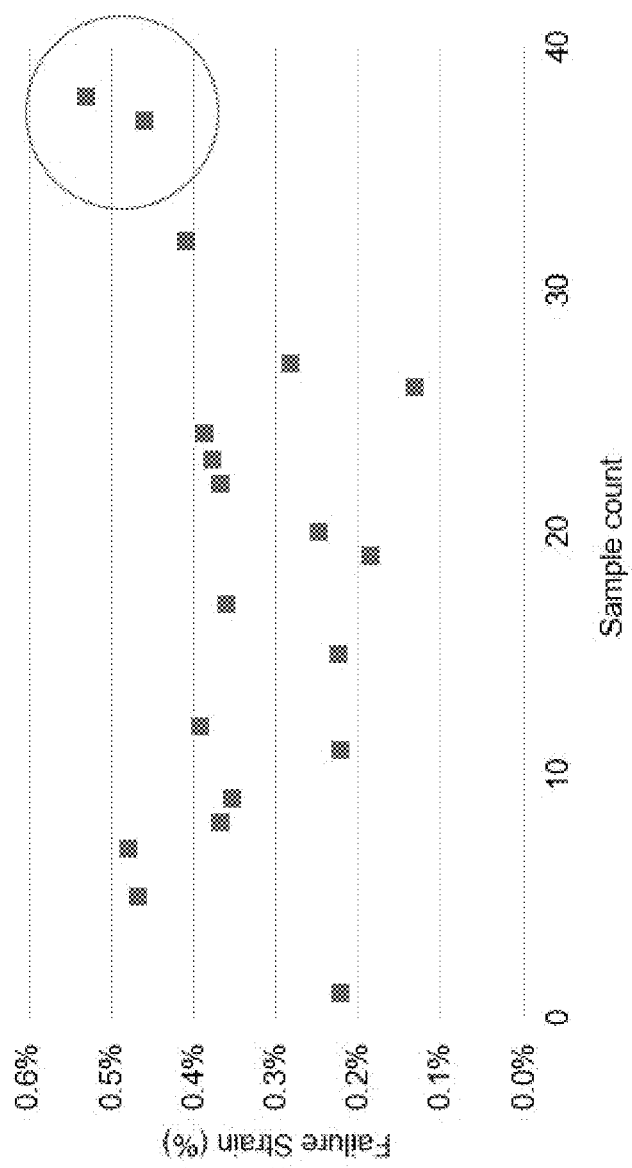
FIG. 13 is a plot of failure strain of glass-based assemblies.

Referring to FIG. 13, a plot, based on empirical examination of glass-based assemblies as disclosed herein having niobia/silica or tantalum/silica coatings described above (i.e. 13L Ta/Si, 7L Ta/Si and Nb/Si), shows failure strains for samples on the Y-axis. The X-axis is the sample count, but the plot only includes those samples that also have had failure modes determined from scanning electron microscopy.

In the plot, the two points circled (0.46% and 0.53%) were fracture failures determined to be stemming from coating failures (e.g., coating defect failures), but the rest were substrate-based failures (i.e. the glass failed first). Based on such findings, Applicants believe that a coating used with glass substrates disclosed herein may be selected to have a lower bound of coating crack onset strain to be 0.25%, such as 0.3%, such as greater than 0.4% or greater than 0.5%, and/or from any such a lower bound up to 2.0% for example.

Now, referring once more to FIG. 8, the coating 114 may be a soft buffer layer between the glass substrate and the layer 814, which may include inorganic coating layers as described above, such as hard, scratch-resistant coatings. Some such soft buffer layers may include organic coatings, such as silane, siloxane, and/or polymeric coatings. In such an arrangement, the coating 114 may remain intact and not fracture before glass of the glass substrate 112, when stretched in a combined glass-based assembly 810, such as when loaded in a ring-on-ring test assembly as disclosed above with the coating-side in tension. The layer 814 may crack but the coating 114 interrupts propagation of such cracks from the layer 814, and dulls impact of stress concentrations created thereby on the surface 122 of the glass.

Construction and arrangements of the compositions, assemblies, and structures, as shown in the various aspects, are illustrative only. Although only a few examples of the aspects have been described in detail in this disclosure, modifications are possible (e.g., variations in sizes, dimensions, structures, shapes, and proportions of the various elements, values of parameters, mounting arrangements, use of materials, colors, orientations) without materially departing from the novel teachings and advantages of the subject matter described herein. For example, the coating layer 114 may be positioned on both major surfaces 116, 120 of a glass-based substrate and on edges 118, or only one major surface 116 or 120 and on edges 118. The order or sequence of any process, logical algorithm, or method steps may be varied or re-sequenced according to alternative embodiments. Other substitutions, modifications, changes and omissions may also be made in the design, operating conditions and arrangement of the various aspects without departing from the scope of the present inventive technology.

What is claimed is:

1. A glass-based assembly, comprising:
a glass substrate comprising a surface, wherein glass of the glass substrate breaks when stretched beyond a fracture strain thereof, wherein the glass of the glass substrate is a non-silicate glass such that the glass comprises less than 20 mol % silica, and wherein the glass of the glass substrate has a modulus of elasticity greater than 100 GPa; and
a coating layer coupled to the glass substrate, wherein the coating layer overlays at least a portion of the surface of the glass substrate,
wherein stretching of coating of the coating layer to the fracture strain of the glass of the glass substrate does not fracture the coating, wherein the coating has a modulus of elasticity greater than 20 GPa; and
wherein ultimate strength of the glass substrate with the coating layer overlaying and coupled thereto is greater than that of the glass substrate alone, without the coating layer.

2. The glass-based assembly of claim 1, wherein, over a range of strain produced by tensile loading the glass of the glass substrate from 0 to 500 kPa, the coating of the coating layer has a modulus of elasticity that is less than 1.1 times that of the glass of the glass substrate.

3. The glass-based assembly of claim 2, wherein the glass substrate has first and second major surfaces facing away from one another, a body of the glass therebetween, and an edge extending between the first and second major surfaces and defining a perimeter thereof, wherein the glass substrate has a thickness defined as a distance between the first and second major surfaces orthogonal to the first major surface in a direction through the body, wherein the coating layer has a thickness defined as a distance orthogonal to the first major surface of the glass substrate and fully through the coating layer, and wherein the thickness of the glass substrate is at least 50 times greater than that of the coating layer.

4. The glass-based assembly of claim 1, wherein ultimate strength of the glass substrate with the coating layer overlaying and coupled thereto is at least 20 MPa greater than that of the glass substrate alone, without the coating layer.

5. The glass-based assembly of claim 1, wherein the glass of the glass substrate is brittle, having a fracture toughness less than 0.8 MPa·m$^{1/2}$.

6. The glass-based assembly of claim 2, wherein the coating of the coating layer and the glass of the glass substrate have a mismatch in modulus of elasticity such that a difference in modulus of elasticity of the coating of the coating layer and that of the glass of the glass substrate, over the range of strain, is at least 20 GPa.

7. The glass-based assembly of claim 1, wherein stretching of the coating of the coating layer to the fracture strain of the glass of the glass substrate is within an elastic regime of the coating.

8. The glass-based assembly of claim 3, wherein the thickness of the coating layer is less than 2 μm, while the thickness of the glass substrate is greater than 400 μm.

9. The glass-based assembly of claim 1, wherein at zero strain or flexing of the glass-based assembly, stress in the coating layer is compressive but less than 1 GPa.

10. The glass-based assembly of claim 1, wherein the coating layer blocks water vapor in air at 250 C, 70% relative humidity, standard atmospheric pressure from reaching the glass substrate underlying the coating layer.

11. The glass-based assembly of claim 1, wherein stretching the glass-based assembly to the fracture strain of the glass of the glass substrate does not delaminate the coating layer from the glass substrate.

12. A glass-based assembly, comprising:
a glass substrate comprising a surface, wherein glass of the glass substrate breaks when stretched beyond a fracture strain thereof, wherein the glass of the glass substrate is a non-silicate glass such that the glass comprises less than 20 mol % silica;
wherein the glass of the glass substrate is stiff, having a modulus of elasticity greater than 100 GPa; wherein the glass of the glass substrate is brittle, having a fracture toughness less than 0.8 MPa·m$^{1/2}$; and
a coating layer coupled to the glass substrate, wherein the coating layer overlays at least a portion of the surface of the glass substrate;
wherein the thickness of the coating layer is less than 2 μm, while the thickness of the glass substrate is greater than 400 μm;
wherein stretching of coating of the coating layer to the fracture strain of the glass of the glass substrate does not fracture the coating;
wherein the coating layer has a modulus of elasticity that is less than 1.1 times that of the glass of the glass substrate, wherein the modulus of elasticity of the coating of the coating layer is greater than 20 GPa; and
wherein ultimate strength of the glass substrate with the coating layer overlaying and coupled thereto at least 20 MPa greater than that of the glass substrate alone, without the coating layer.

13. The glass-based assembly of claim 12, wherein at zero strain or flexing of the glass-based assembly, stress in the coating layer is compressive but less than 1 GPa.

14. A glass-based assembly, comprising:
- a glass substrate comprising a surface, wherein glass of the glass substrate breaks when stretched beyond a fracture strain thereof, wherein the glass of the glass substrate is a non-silicate glass such that the glass comprises less than 20 mol % silica, and wherein the glass of the glass substrate has a modulus of elasticity greater than 100 GPa; and
- a coating layer coupled to the glass substrate, wherein the coating layer overlays at least a portion of the surface of the glass substrate,
- wherein stretching of coating of the coating layer to the fracture strain of the glass of the glass substrate does not fracture the coating, wherein the coating has a modulus of elasticity greater than 20 GPa; and
- wherein ultimate strength of the glass substrate with the coating layer overlaying and coupled thereto is greater than that of the glass substrate alone, without the coating layer;
- wherein stretching the glass-based assembly to the fracture strain of the glass of the glass substrate does not delaminate the coating layer from the glass substrate;
- wherein the coating layer blocks water vapor in air at 250 C, 70% relative humidity, standard atmospheric pressure from reaching the glass substrate underlying the coating layer.

15. The glass-based assembly of claim 14, wherein stretching of the coating of the coating layer to the fracture strain of the glass of the glass substrate is within an elastic regime of the coating.

16. The glass-based assembly of claim 14, wherein, over a range of strain produced by tensile loading the glass of the glass substrate from 0 to 500 kPa, the coating of the coating layer has a modulus of elasticity that is less than 1.1 times that of the glass of the glass substrate, wherein the glass substrate has first and second major surfaces facing away from one another, a body of the glass therebetween, and an edge extending between the first and second major surfaces and defining a perimeter thereof, wherein the glass substrate has a thickness defined as a distance between the first and second major surfaces orthogonal to the first major surface in a direction through the body, wherein the coating layer has a thickness defined as a distance orthogonal to the first major surface of the glass substrate and fully through the coating layer, and wherein the thickness of the glass substrate is at least 50 times greater than that of the coating layer, wherein the thickness of the coating layer is less than 2 μm, while the thickness of the glass substrate is greater than 400 μm.

17. The glass-based assembly of claim 14, wherein at zero strain or flexing of the glass-based assembly, stress in the coating layer is compressive but less than 1 GPa.

* * * * *